US007942778B2

(12) United States Patent
Williames

(10) Patent No.: US 7,942,778 B2
(45) Date of Patent: May 17, 2011

(54) HYDROMECHANICAL VARIABLE SPEED TRANSMISSION

(76) Inventor: Geoffrey Allan Williames, Warragul (AU)

( * ) Notice: Subject to any disclaimer, the term of this patent is extended or adjusted under 35 U.S.C. 154(b) by 405 days.

(21) Appl. No.: 11/666,099

(22) PCT Filed: Oct. 28, 2005

(86) PCT No.: PCT/AU2005/001672
§ 371 (c)(1),
(2), (4) Date: Jun. 13, 2007

(87) PCT Pub. No.: WO2006/045158
PCT Pub. Date: May 4, 2006

(65) Prior Publication Data
US 2007/0249454 A1   Oct. 25, 2007

(30) Foreign Application Priority Data
Oct. 29, 2004 (AU) ................................ 2004906257

(51) Int. Cl.
*F16H 47/04* (2006.01)
(52) U.S. Cl. .......................................... 475/83; 475/74
(58) Field of Classification Search .................. 475/78, 475/83, 200, 201, 203, 221, 230, 74
See application file for complete search history.

(56) References Cited

U.S. PATENT DOCUMENTS

| 4,261,226 A | | 4/1981 | Orshansky, Jr. et al. |
| 4,867,012 A | * | 9/1989 | McGarraugh .................... 475/72 |
| 6,165,094 A | * | 12/2000 | Williames ......................... 475/6 |
| 6,773,368 B1 | * | 8/2004 | Williames ....................... 475/74 |

FOREIGN PATENT DOCUMENTS

| DE | 3239223 | | 6/1984 |
| SU | 1606785 A | * | 11/1990 |
| WO | WO99/61820 | | 12/1999 |

* cited by examiner

*Primary Examiner* — Tisha D Lewis
(74) *Attorney, Agent, or Firm* — Husch Blackwell LLP

(57) ABSTRACT

A hydromechanical variable speed transmission (1) including outer and inner differential gear trains each having a carrier carrying planet pinions meshing with two coaxial side gears, the side gears of the outer differential gear train being ring gears one of which is an input ring gear (11) and the other (52) of which rotatably drives the planet pinion carrier of the inner differential gear train, the side gears of the inner differential gear train respectively rotatably driving two coaxial output shafts which extend axially outwards through the ring gears (11, 52) of the outer differential gear train, the planet pinion carrier (14) of the outer differential gear train rotatably driving a hydraulic motor (2) which is fluidly coupled by a hydraulic circuit to rotatably drive a hydraulic pump (3) having a pump control for changing the displacement of the hydraulic pump (3) in response to rotation thereof, wherein the pump control is fixed from rotation to thereby isolate the input ring gear (11) from torque recirculation.

5 Claims, 26 Drawing Sheets

REFERENCES
- $I$ = INPUT
- $R$ = RESTRAINT
- $O$ = OUTPUT

7. TRANSMISSION FORMULA WILL THEN BE.
- O OUTPUT = 2 × R RESTRAINT − I INPUT

∴ 2:1 = 2 × R 1000 − I 2000 = O = 0

1:1 = 2 × R 2000 − I 2000 = O = 2000

3:1 = 2 × R 666.66 − I 2000 = O = −666.68 REVERSE

AS THIS FORMULA DIRECTLY DEALS WITH RATIOS THE ABOVE CALCULATIONS ARE USED FOR RPM AND TORQUE.

RPM, TORQUE NM & POWER KW

| Rano NO | I RPM | I NM | I KW | R RPM | R NM | R KW | O RPM | O NM | O KW |
|---|---|---|---|---|---|---|---|---|---|
| 1 | 500 | 7 | 0.37 | 250 | 7252 | 190 | 0 | 3626 | 0 |
| 2 | 500 | 91 | 4.76 | 256 | 7252 | 185 | 12.5 | 3626 | 4.74 |
| 3 | 500 | 181 | 9 | 262 | 7252 | 181 | 25 | 3626 | 9 |
| 4 | 500 | 363 | 19 | 275 | 7252 | 172 | 50 | 3626 | 19 |
| 5 | 500 | 544 | 28 | 287 | 7252 | 162 | 75 | 3626 | 28 |
| 6 | 500 | 725 | 37 | 300 | 7252 | 152 | 100 | 3626 | 37 |
| 7 | 500 | 906 | 47 | 312 | 7252 | 142 | 125 | 3626 | 47 |
| 8 | 500 | 1089 | 57 | 325 | 7252 | 133 | 150 | 3626 | 57 |
| 9 | 500 | 1272 | 67 | 337 | 7252 | 124 | 175 | 3626 | 67 |
| 10 | 500 | 1399 | 73 | 350 | 6997 | 110 | 200 | 3498 | 73 |
| 11 | 500 | 1399 | 73 | 362 | 6213 | 90 | 225 | 3107 | 72 |
| 12 | 500 | 1399 | 73 | 375 | 5598 | 74 | 250 | 2799 | 73 |
| 13 | 500 | 1399 | 73 | 387 | 5088 | 60 | 275 | 2544 | 73 |
| 14 | 500 | 1399 | 73 | 400 | 4646 | 49 | 300 | 2323 | 73 |
| 15 | 500 | 1399 | 73 | 412 | 4304 | 40 | 325 | 2152 | 73 |
| 16 | 500 | 1399 | 73 | 425 | 3995 | 32 | 350 | 1997 | 73 |
| 17 | 500 | 1399 | 73 | 437 | 3729 | 24 | 375 | 1865 | 73 |
| 18 | 500 | 1399 | 73 | 450 | 3498 | 18 | 400 | 1749 | 73 |
| 19 | 500 | 1399 | 73 | 462 | 3290 | 13 | 425 | 1645 | 73 |
| 20 | 500 | 1399 | 73 | 475 | 3108 | 8 | 450 | 1554 | 73 |
| 21 | 500 | 1399 | 73 | 487 | 2943 | 4 | 475 | 1471 | 73 |
| 22 | 500 | 1399 | 73 | 500 | 2799 | 0 | 500 | 1399 | 73 |

1. LB Ft CONVERTED TO Nm TO NEAREST DECIMAL POINT.
2. = Nm × RPM ÷ 9549.
3. R = TOTAL REACTIVE TORQUE. NOTE: NO ALLOWANCE FOR THE POSITIVE RECIRCULATING BALANCING REACTIVE TORQUE HAS NOT BEEN DEDUCTED FROM R.

Work Sheet NO 5

Figure 25

HYDROMECHANICAL VARIABLE SPEED TRANSMISSION

FIELD OF THE INVENTION

The present invention relates to a hydromechanical variable speed transmission.

BACKGROUND OF THE INVENTION

The present applicant's WO 98/17927 discloses a mechanical variable speed transmission having interconnected outer and inner differential gear trains for differentially driving two axles. The present applicant's WO 99/61820 discloses a hydraulic transmission connected in parallel to the compound differential of WO 98/17927 for controlling the torque/speed ratio of the two axles. The disclosures of WO 98/17927 and WO 99/61820 are incorporated herein by reference.

It is desirable to provide a hydromechanical variable speed transmission which is compact, clutchless, efficient, reliable and easy to manufacture.

SUMMARY OF THE INVENTION

According to the present invention, there is provided a hydromechanical variable speed transmission including outer and inner differential gear trains each having a carrier carrying planet pinions meshing with two coaxial side gears, the side gears of the outer differential gear train being ring gears one of which is an input ring gear and the other of which rotatably drives the planet pinion carrier of the inner differential gear train, the side gears of the inner differential gear train respectively rotatably driving two coaxial output shafts which extend axially outwards through the ring gears of the outer differential gear train, the planet pinion carrier of the outer differential gear train rotatably driving a hydraulic motor which is fluidly coupled by a hydraulic circuit to rotatably drive a hydraulic pump having a pump control for changing the displacement of the hydraulic

BRIEF DESCRIPTION OF THE DRAWINGS

Embodiments of the present invention will now be described solely by way of non-limiting example and with reference to the accompanying drawings in which:

FIG. 25 is a data table of calculated input, restraint and output torques for a conventional heavy duty front end four wheel drive loader.

DETAILED DESCRIPTION OF THE EMBODIMENTS

The differential transmission of the present applicant's WO 99/61820 requires a restraint for the annular pinion carrier and displacement of hydraulic fluid allows the restrained torque forces to rotate the pinion carrier at a different speed than the first bevel gear. This differential action allows variation of the speed of rotation and the direction of the second bevel gear output. When input torque is applied to the input first bevel gear and the output second bevel gear is restrained by a work load, then the annular pinion carrier will rotate around the first bevel gear and rotate forward in the same direction as the input direction of rotation and must be restrained to provide rotation and torque to the second bevel gear output to be able to effectively do work.

Figure 1:
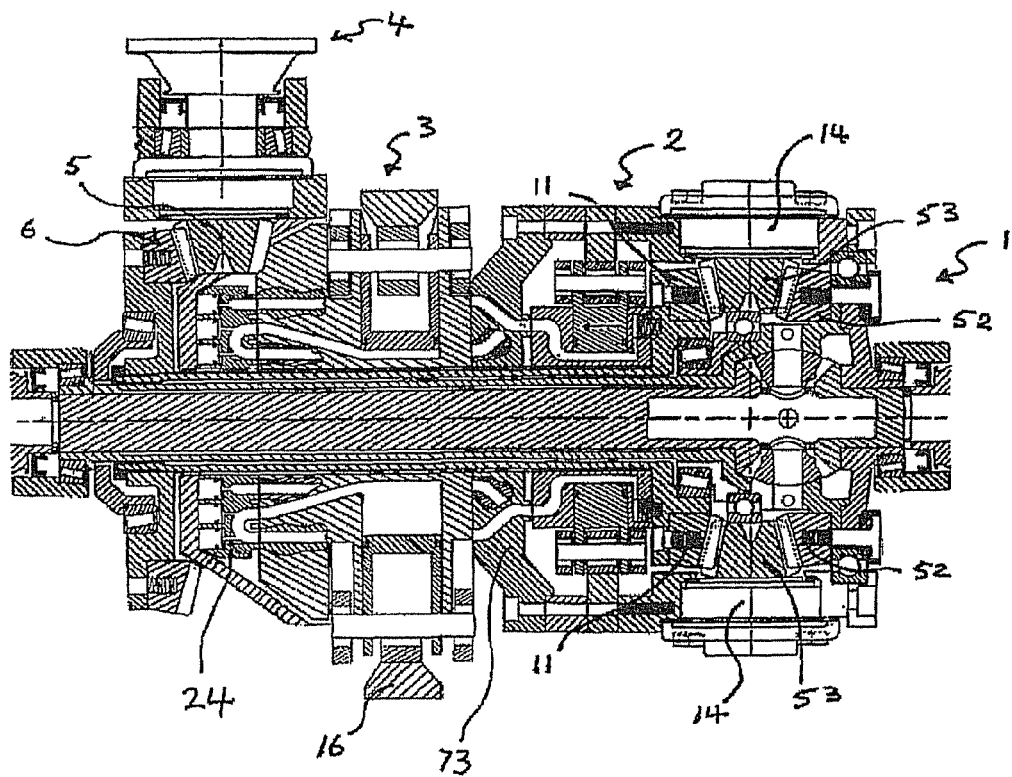
FIGS. 1-4 are schematic representations of a first embodiment of a hydromechanical variable speed transmission of the present invention.
Figure 2:
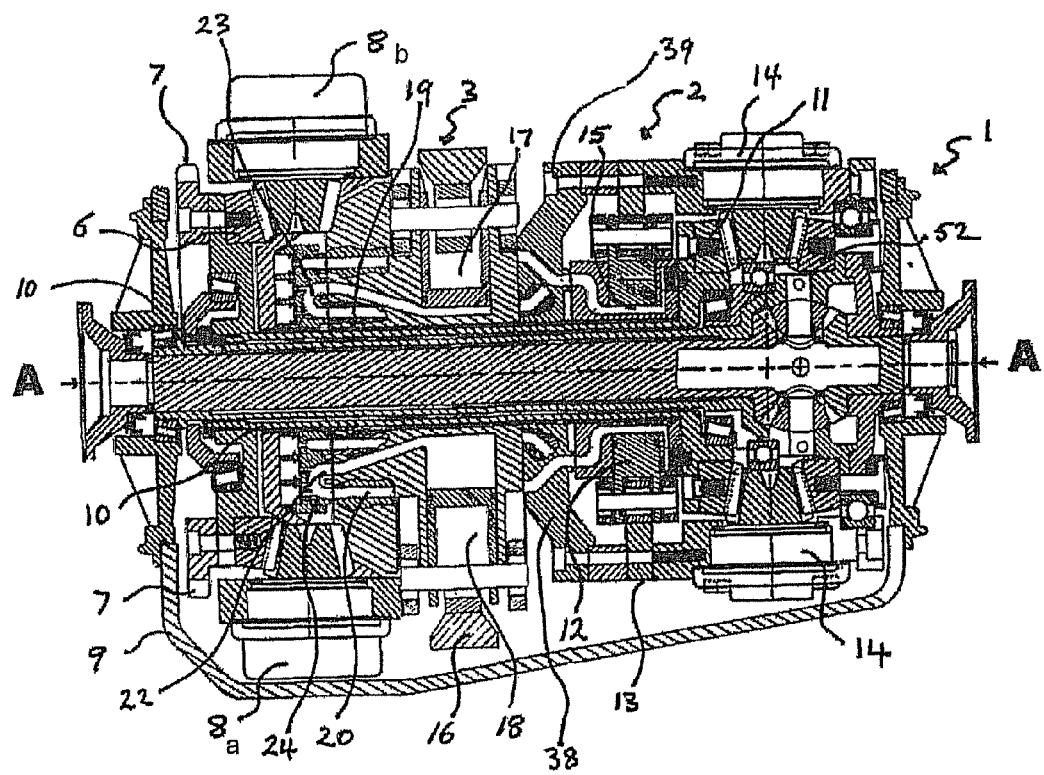
Figure 23:
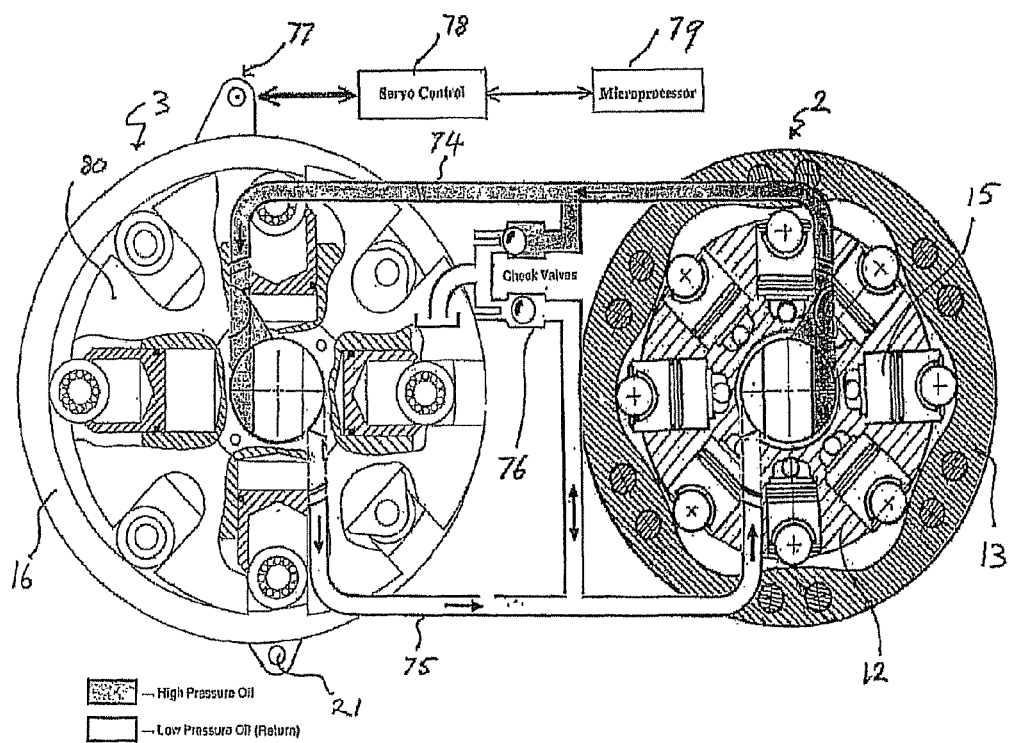
FIG. 23 is a hydraulic circuit diagram of the first embodiment.

FIG. 1 illustrates a first embodiment of a power transmission 1 which includes a hydraulic restraint motor 2, a variable displacement control pump 3, a tail shaft power input 4, a power input pinion 5 and primary power input crown wheel 6. This configuration is suited for use in trucks, tractors and all vehicle applications where the power is delivered to the axle and differential via a tail shaft, including four wheel drive vehicles where the power is normally transferred from a transfer case to a front and rear axle. For example, the power transmission 1 may replace a standard differential and eliminate a clutch and a gearbox. FIG. 2 illustrates an alternative configuration in which the primary power input is delivered via a gear sprocket or belt 7 via the crown wheel 6. In both power input configurations, the crown wheel 6 also provides the power transmission for a scavenger pump 8a which returns case drain and lubrication oil through a filter back to the oil tank which can be conveniently located any where on the vehicle. The crown wheel 6 also supplies power to the charge pump 8b which makes up for any loss of oil via supplying the pump motor closed loop on the low pressure side of the circuit via a check valve 76 as illustrated in FIG. 23.

Figure 17:
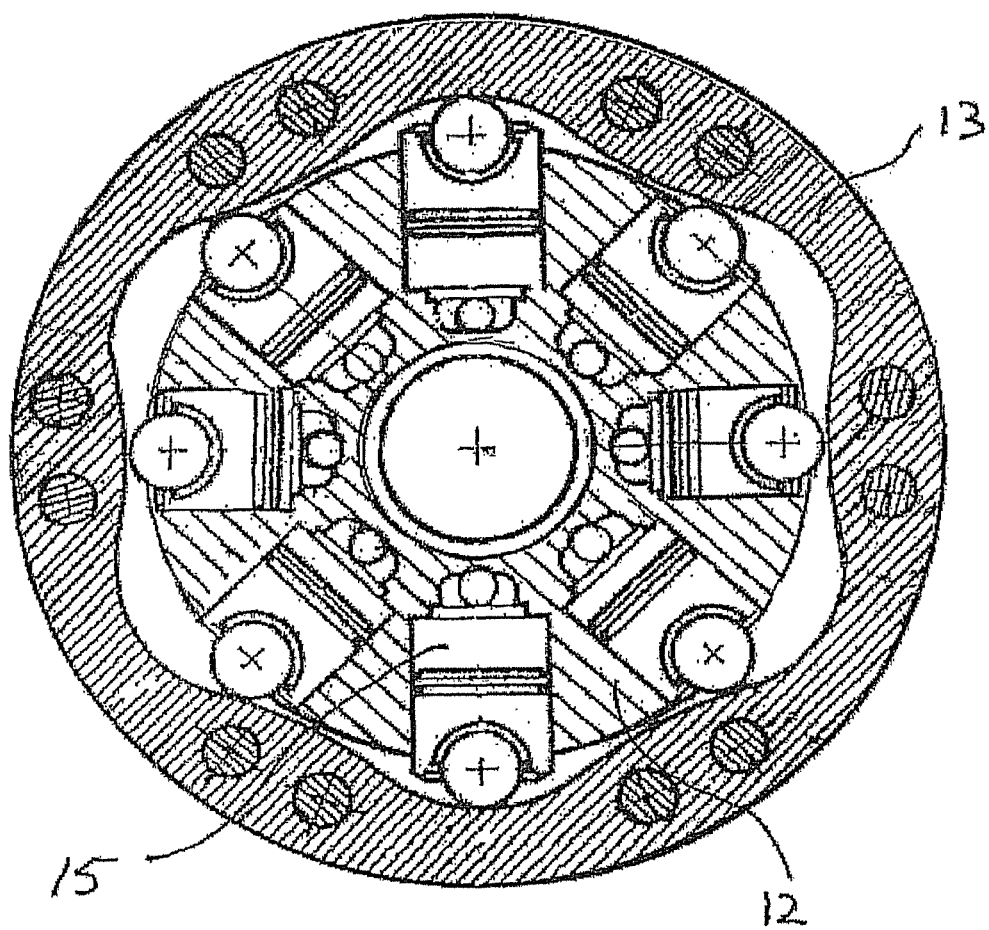
FIGS. 17-20 are schematic representations of a radial piston hydraulic motor of the first embodiment.
Figure 18:
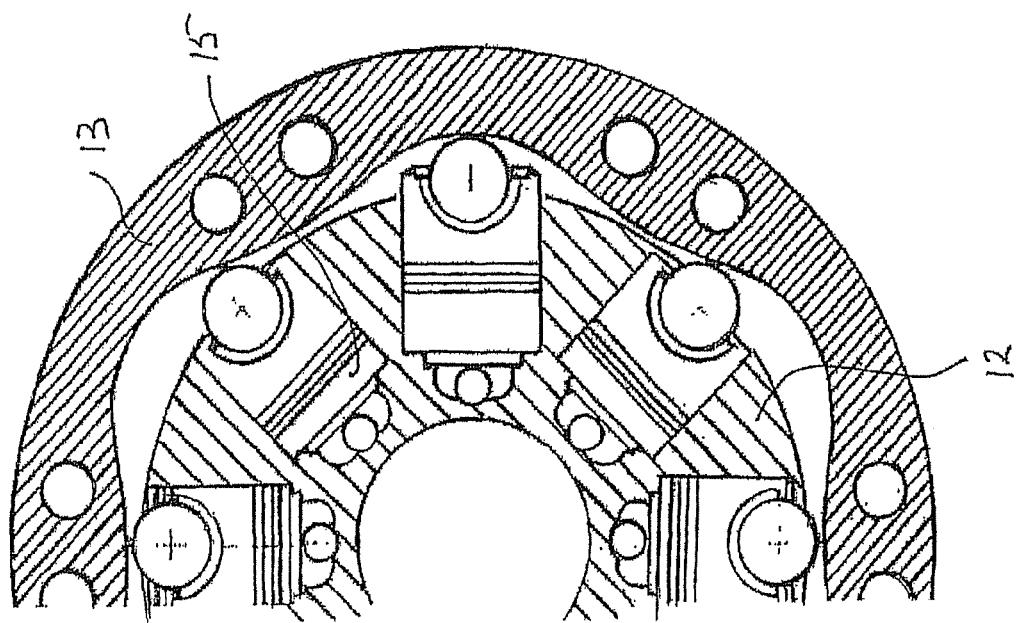

All of the components of the power transmission 1, including the motor 2 and the pump 3, rotate about a common axis A-A and are compactly located within a housing 9. The power input is transferred via the hollow shaft 10 to the first bevel gear 11 which also is connected to the motor piston group 12. The hydraulic restraint motor 2 includes a waveform cam track 13 which is attached to the annular pinion carrier 14. In use, the relative speeds of rotation of the first bevel gear 11 and the annular pinion carrier 14 are controlled via the displacement of hydraulic fluid, for example oil, through the pump 3, allowing the motor piston rotating group 12 to rotate within the wave form cam track 13 as illustrated in FIGS. 17, 18 and 23.

To allow the oil to be displaced from the motor cylinder cavity 15, the pump circular cam track 16 must be moved off centre to achieve a displacement variation between pump cylinders 17 and 18 as illustrated in FIG. 2. Referring to FIGS. 1, 2, 4 and 23, when the cam track 16 is moved off centre the oil flows from the pump into galleries 19 through the motor 2 and back through galleries 20 in a closed loop. FIG. 2 is sectioned horizontally at the midpoint to illustrate the function of components and the oil flow path. If the pump 3 cam track 16 is moved off centre, then the displacement of cylinder 18 becomes greater and the volume of cylinder 17 becomes less. Referring to FIGS. 11-13 and 23, the cam track 16 is fixed at a pivot point 21 so that the pump displacement is via two separate semicircular kidney shaped ports 22 and 23, and the pump commutator plate 24 is fixed from rotation. Referring to FIG. 2 and FIGS. 11-13, oil always enters the two central galleries of the valve plate 24 and from there to the 360 degree high and low pressure full circle galleries 19 and 20.

Figure 13:
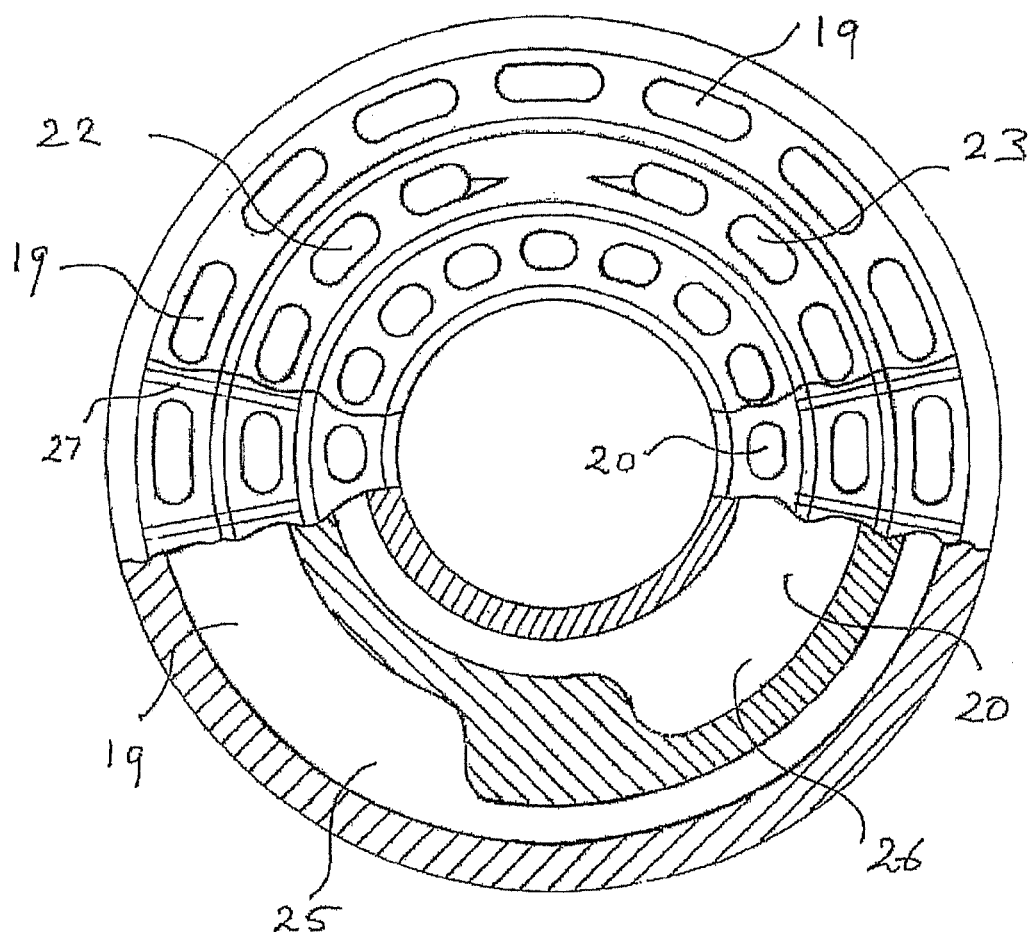
Figure 14:
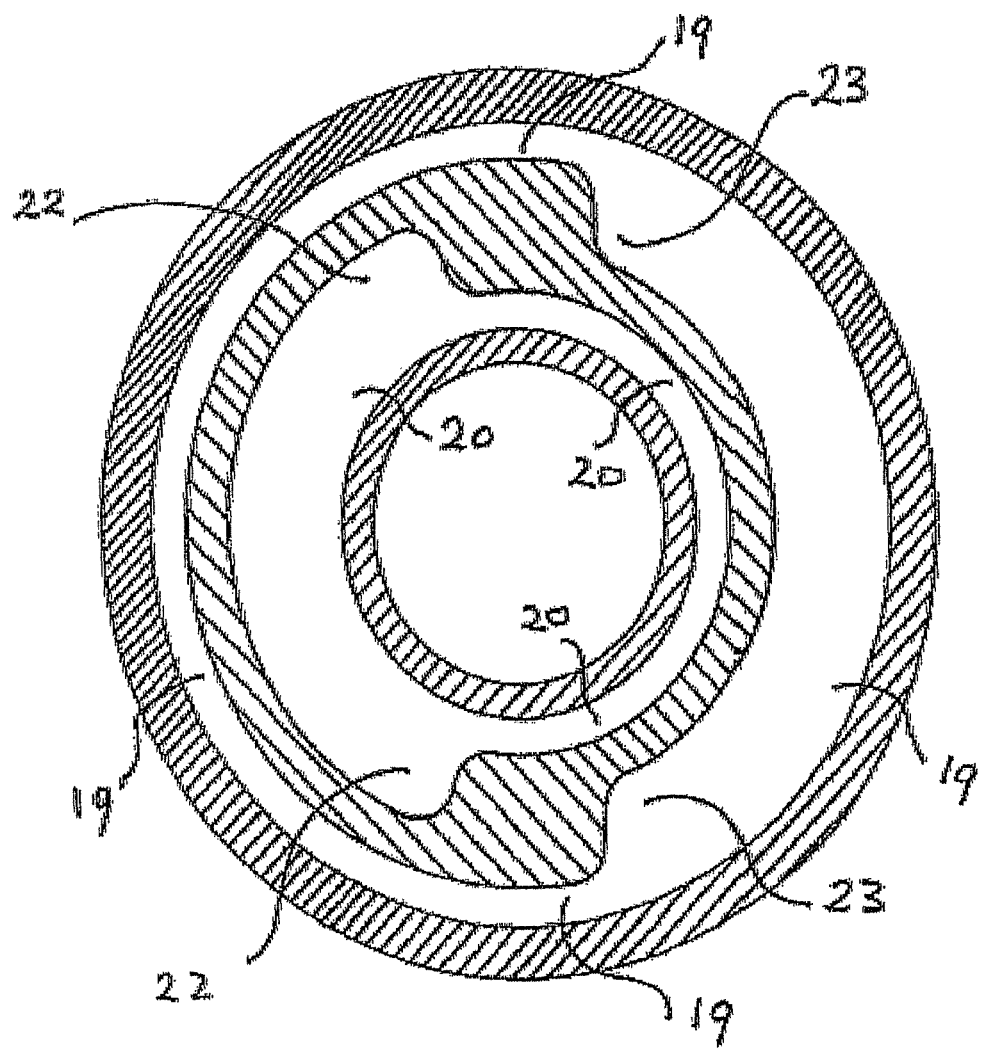
Figure 16:
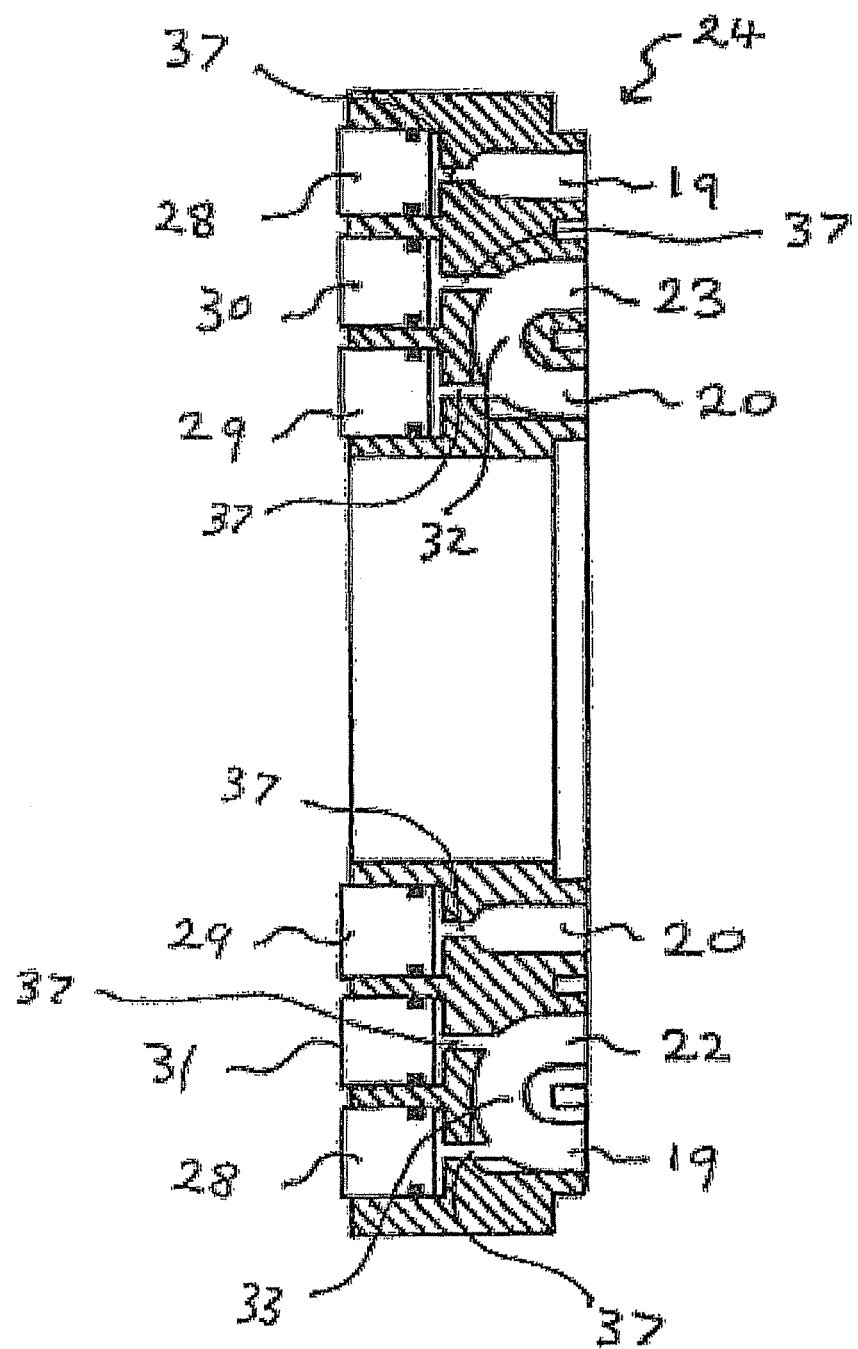

FIG. 13 illustrates oil flow from the pump semicircular galleries to the full circle high and low pressure ports via galleries 25 and 26 linking with galleries and ports 19 and 20. As there are four zones of pressure within the valve plate face at 19, 20, 22, and 23, and as hydraulic pressure balancing is used to hold the contact faces together, it is necessary to release any leakage from each zone. This is done via the galleries 27 illustrated in FIGS. 11-13. Referring to FIGS. 14 and 16, the galleries transfer the pump kidney shaped high and low pressure ports 22 and 23 to the full circle high and low pressure ports 19 and 20.

Figure 3:
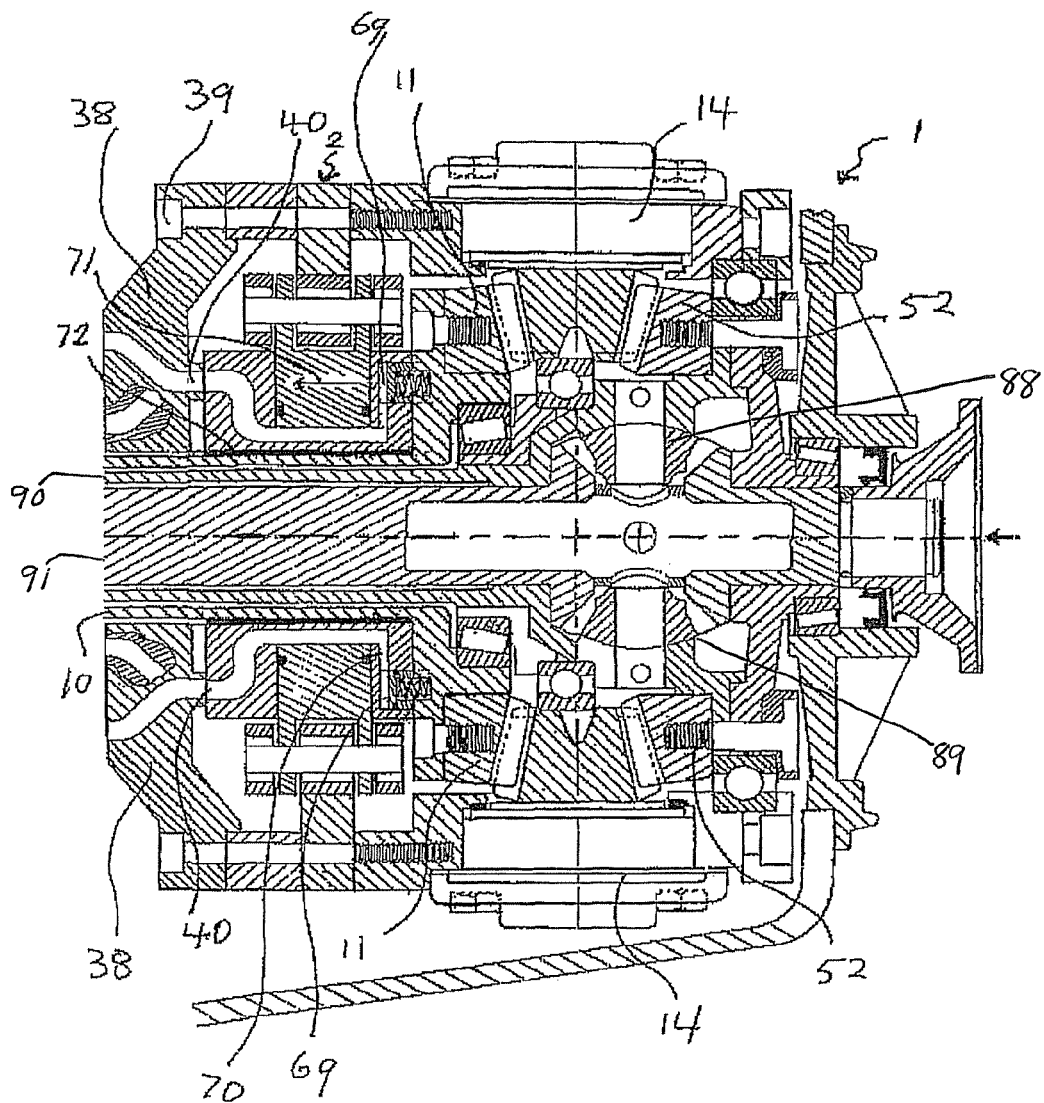
Figure 4:
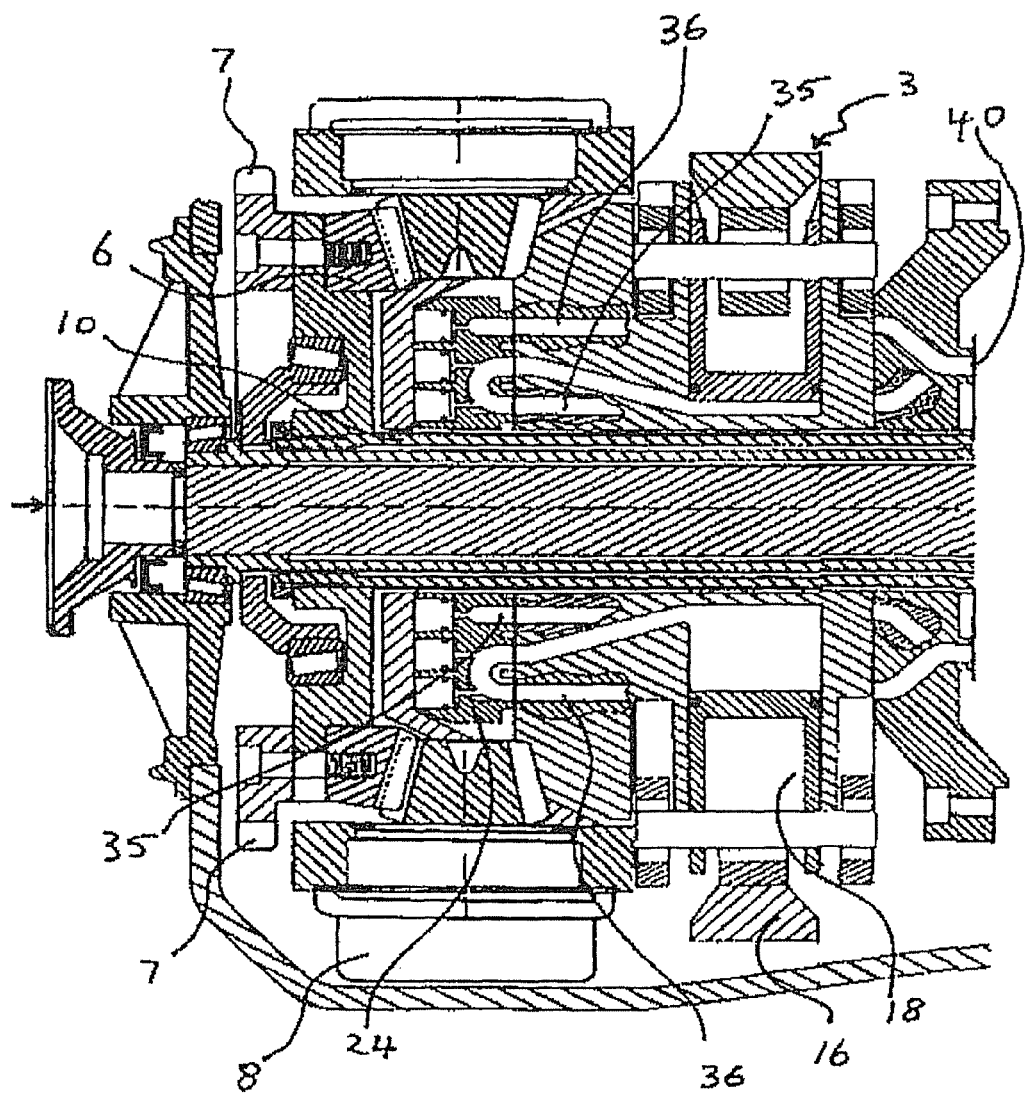
Figure 15:
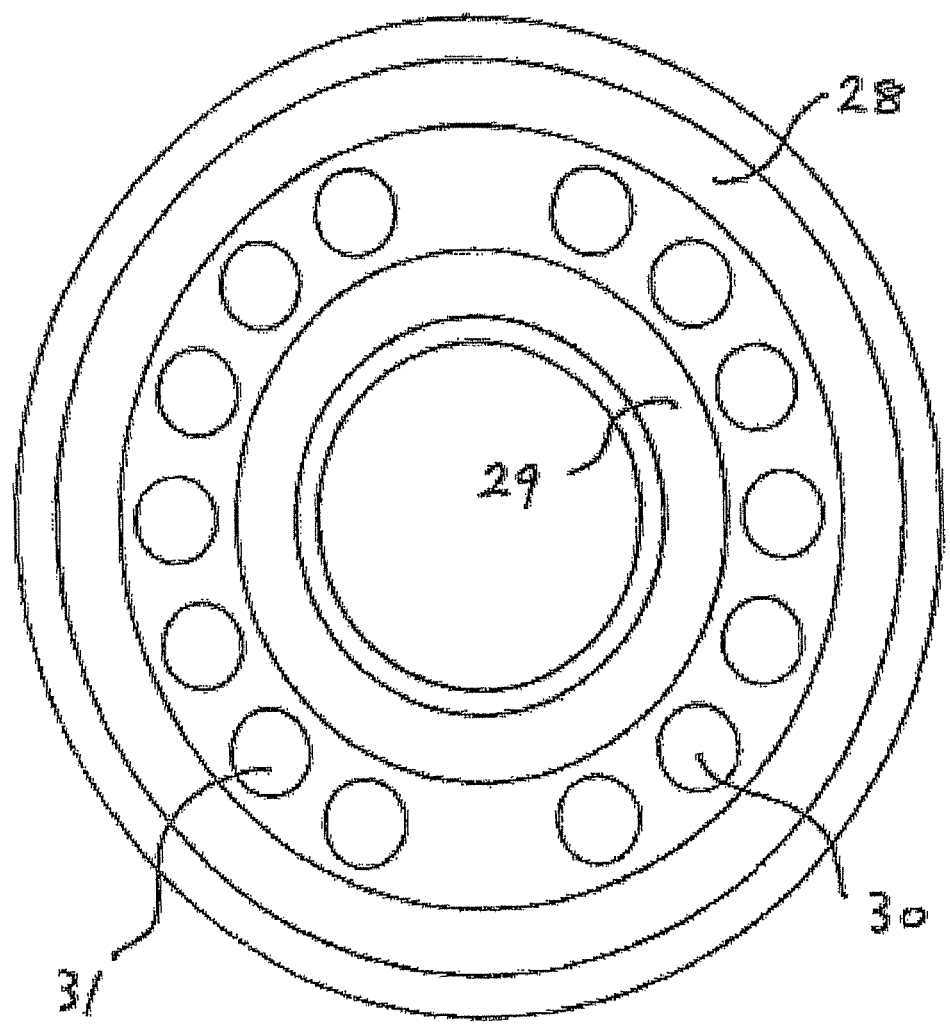

Referring to FIGS. 15 and 16, the appropriate balance of hydraulic commutator face clamping forces automatically and accurately adjust to the varying operational pressures by means of annular (or doughnut-shaped) piston rings 28 and 29 for the full circle high and low pressure areas and semi-spherical banks of individual pistons 30 and 31 to provide balance for the two separate areas of high and low pressure which can reverse subject to acceleration or deceleration. The galleries 37 provide the connection for oil flow from the different pressure zones to the respective pistons. As illustrated in FIGS. 16 and 14, the galleries 32 and 33 of the valve plate 24 receive the oil flow in two separate semicircular zones and return it back to full circle high and low pressure ports 19 and 20 to and through the galleries 35 and 36 in the rotating pump body as illustrated in FIG. 4. The oil flow then enters the valve plate 38 which has the galleries joining the pump face and sealed via "O" rings as illustrated in FIG. 3.

Figure 19:
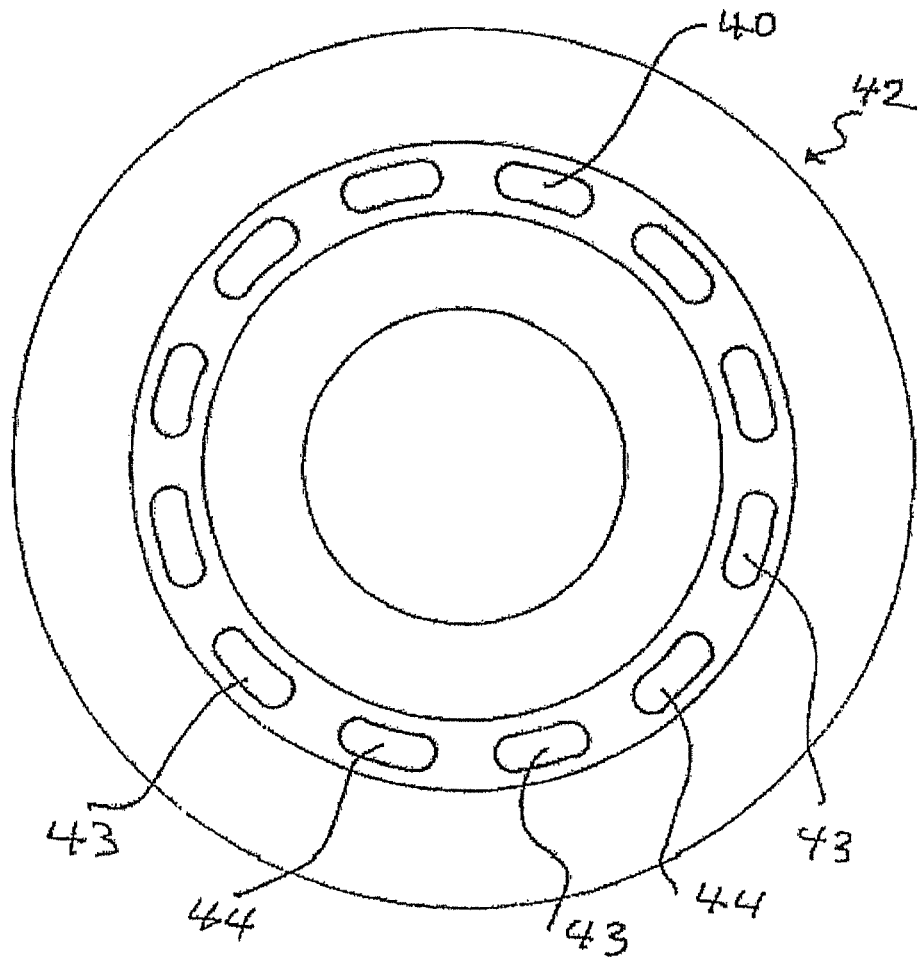
Figure 20:
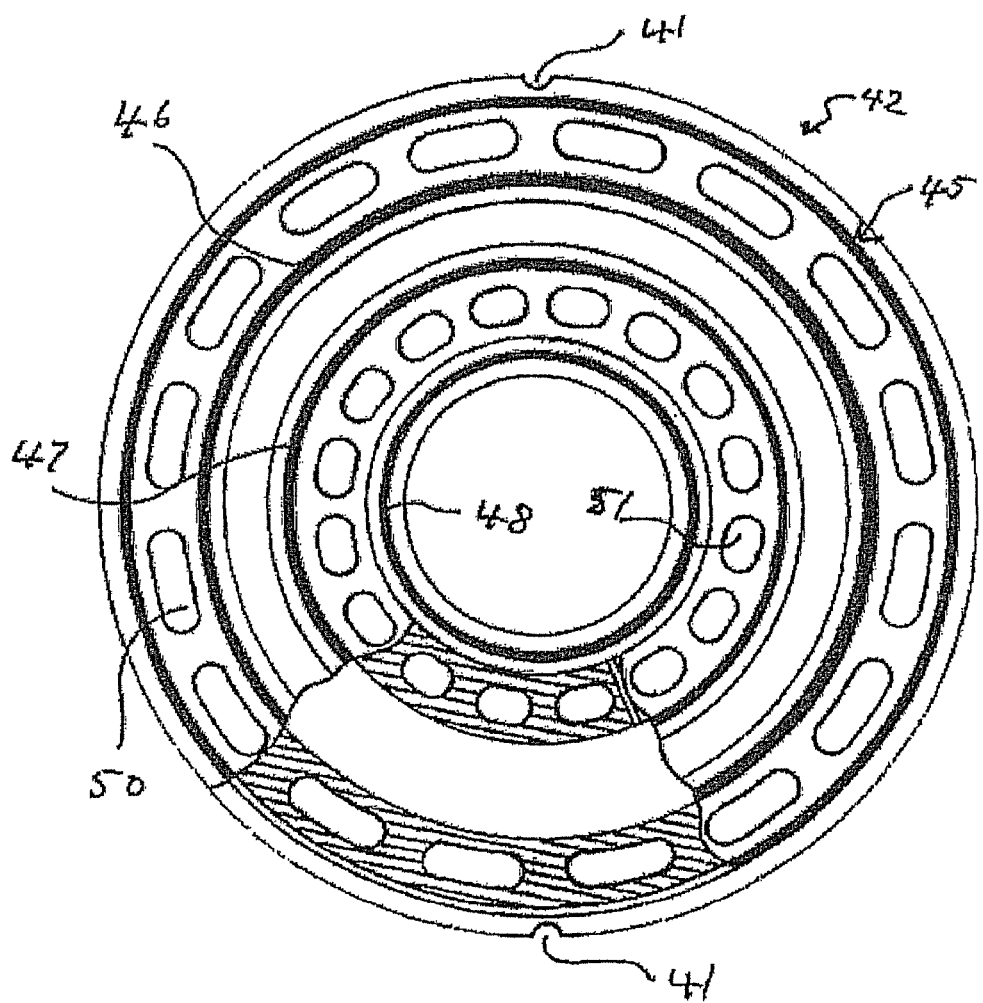

Referring to FIGS. 2, 4 and 17-18, the valve plate is bolted to the pump rotating group this is also connected by fasteners 39 to the annular pinion carrier 14, which both serves the purpose of driving the pump piston rotating group 3 and also ensuring that the radial piston hydraulic restraint motor face ports 40, stay correctly aligned with the waveform motor cam track 13 as illustrated in FIGS. 2, 3, 4, 19 and 21. Referring to FIGS. 3, 4 and 19-21, the commutator/valve plate 42 is fixed to the pump face 3 and drive assembly 38 by location dowels and notches 41 to ensure proper timing with the waveform motor cam plate 13. FIG. 19 illustrates that the alternating high and low pressure ports 43 and 44 remain timed with the wave form motor cam track at all times. FIG. 20 illustrates the pump face side of the motor commutator/valve plate showing "O" rings 45, 46, 47 and 48 to seal the full circle high and low pressure port zones against the pump face 3 in FIG. 2.

Figure 21:
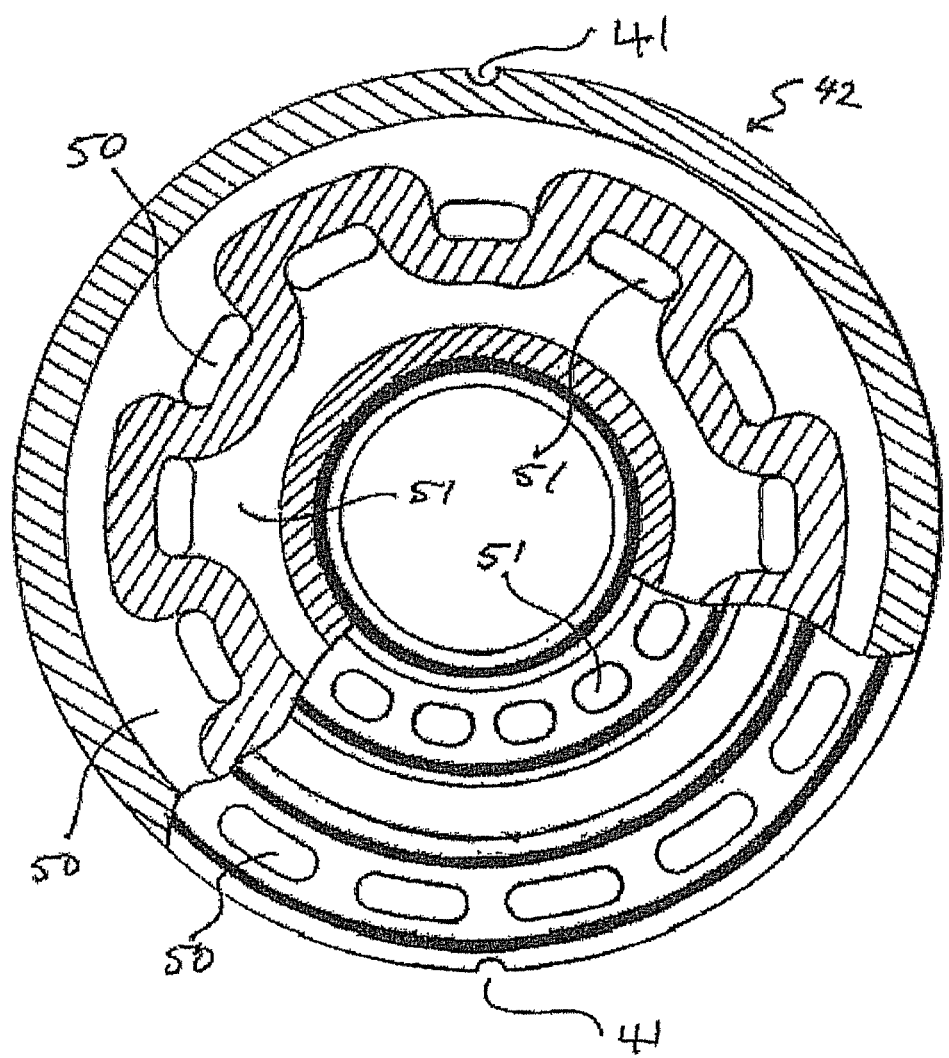
FIGS. 21 and 22 are schematic representations of a rotatable commutator of the first embodiment.
Figure 22:
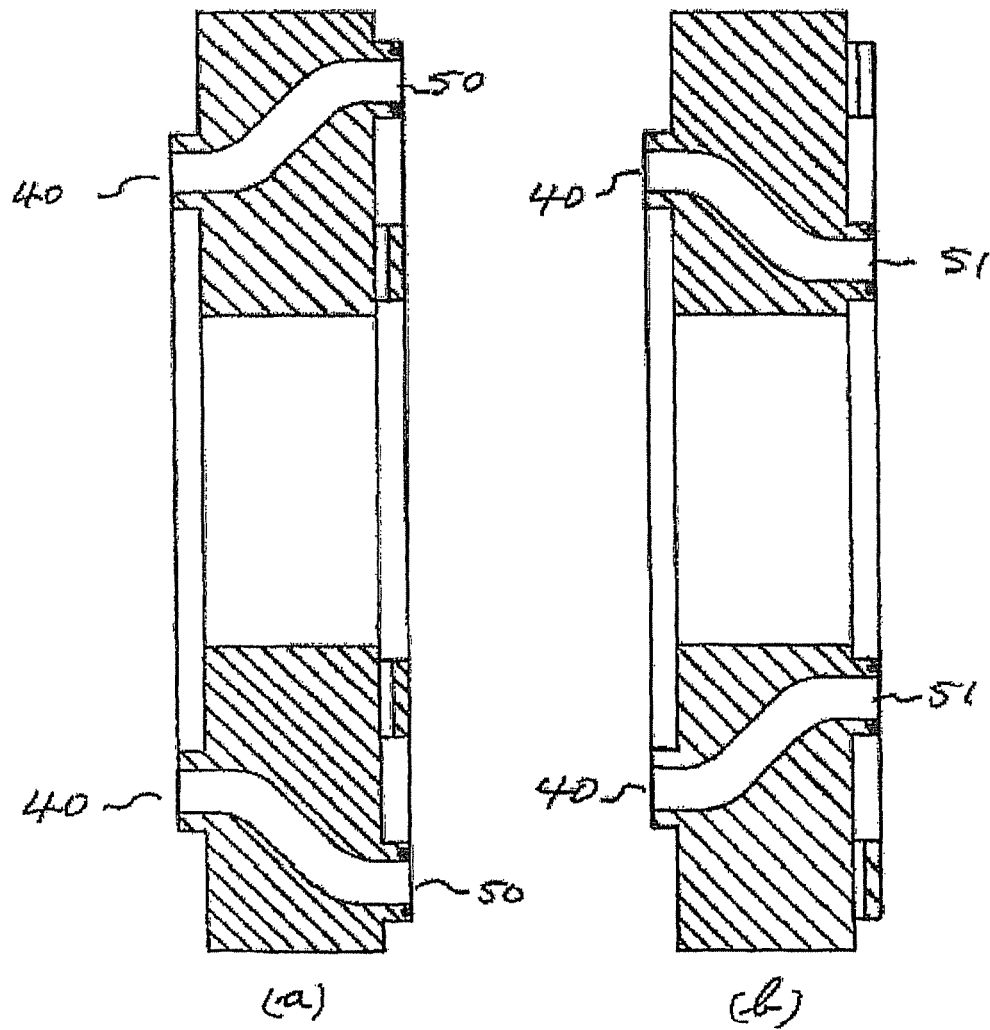

Referring to FIGS. 20 and 21, the separate full circle high and low pressure zones 50 and 51 correspond with the pump pressure zones 19 and 20 illustrated in FIGS. 11-14. FIGS. 22(a) and 22(b) illustrate the high and low pressure galleries 40 and 50 which connect to the motor commutator/valve face ports 40 so that there is alternating ports of high and low pressure 43 and 44 in FIG. 19. As illustrated in FIG. 3, it is necessary to have the proper hydraulic balanced force to maintain the sealing of the hydraulic motor commutator/valve face 40. This is achieved by having an annular piston 69 connected to the cylinder chamber via gallery 70. By this means the pressure in the cylinder is applied to the annular (doughnut-shaped) piston 69 applying a force in the direction of the arrow 71. This in turn applies the force to the rotating piston group causing it to slide along the hollow shaft 10 and the spline 72, to provide the correct balanced force proportionate to the cylinder chamber and commutator internal hydraulic pressure to seal the rotating commutator/valve plate face connection. Referring to FIG. 2, the valve plate attachment 38 restrains the clamping forces applied via the connection 39 to the annular pinion carrier 14. By this means, the varying forces applied to the pump commutator plate 24 and the motor commutator plate 73 illustrated in FIG. 1 are isolated.

Figure 5:
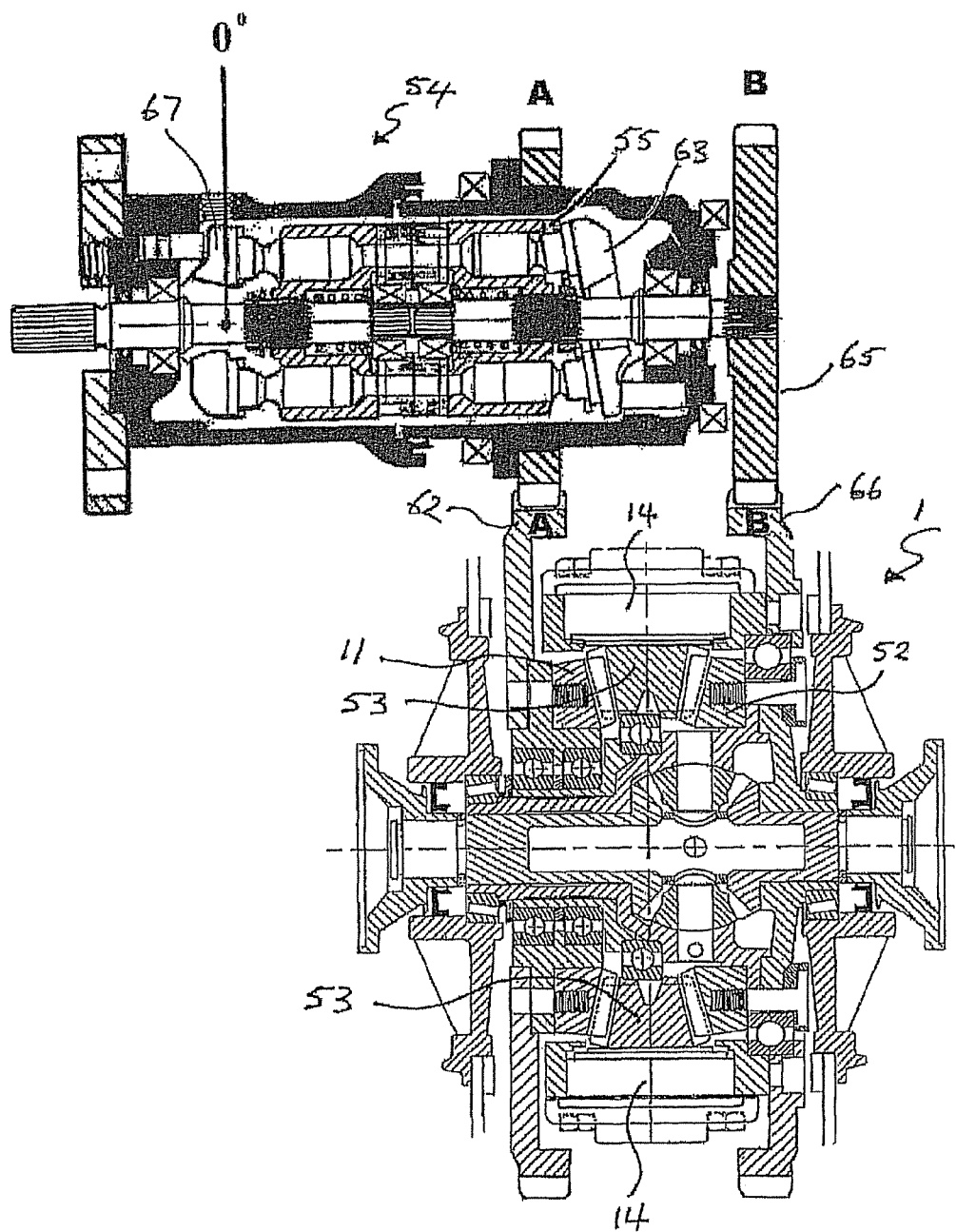
FIGS. 5 and 6 are schematic representations of a second embodiment of a hydromechanical variable speed transmission of the present invention.
Figure 6:
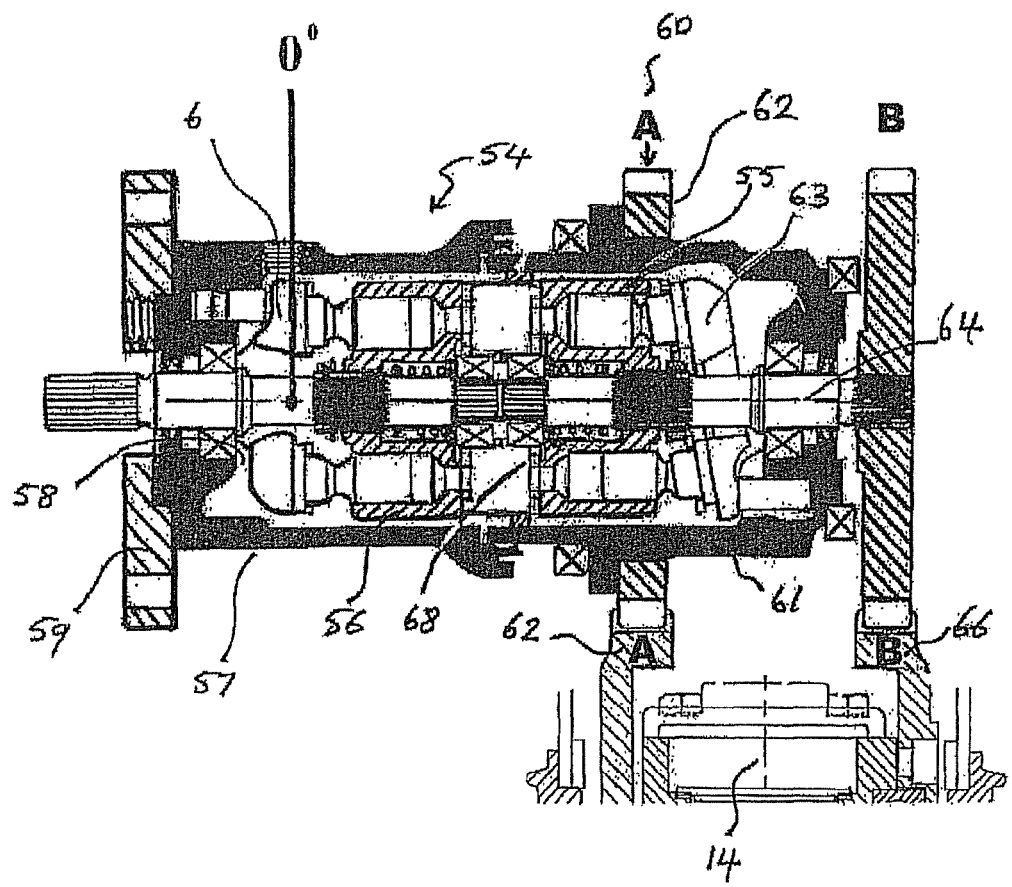

FIGS. 5 and 6, illustrate a second embodiment of a power transmission 1 having a first bevel gear input 11, pinions 53, a pinion carrier 14 and a second bevel gear output. The hydraulic power unit 54 is comprised of a fixed displacement motor 55 and variable displacement axial piston pump 56. The pump housing 57 and variable swash plate 58 are fixed via the pump flange 59. The power input to the hydraulic power unit 54 is via gear chain or belt 62 at A 60, this is attached to the motor housing 61 and also provides the power input at A 62 to the first bevel gear 11. The fixed motor swash plate 63 rotates in unison with the motor housing 61, and gear sprocket or pulley 62 and is connected to and rotates the first bevel gear 11 at a constant ratio. The motor 55 is free to rotate being controlled by the displacement of the pump in a closed loop circuit. The motor shaft 64 is connected to the gear 65 which in turn is connected via power input B 66 to the annular pinion carrier 14. The motor shaft 64 is connected via a splined coupling with the pump shaft to provide the input drive to the pump piston rotating group 56 and continue through the stationary pump base 59 for driving a charge pump to supply oil to the low pressure side of the closed loop circuit via a check values. The pump piston rotating group is driven via the annular pinion carrier at B 66. The flow control and displacement control-pump is restraining the annular pinion carrier 14 which is restrained by the variable swash plate 67 which is fixed. The pump and motor cases have a relatively low pressure seal in FIG. 5 to allow the motor case to rotate while the pump remains stationary without leakage.

By altering the angle of the variable swash plate 67, the pump displacement is changed causing the speed of rotation between A 62 input to the first bevel gear and input B 66 annular pinion carrier with the proportionate variation of speed and direction of rotation of the second bevel gear 52 output. As the pump valve plate and variable swash plate 67 are fixed, the relationship between the semicircular kidneys shaped high and low pressure ports remain the same. The motor piston rotating group 55 rotates at a variable speed to the motor housing 61 and the fixed swash plate 63 which is fixed to the motor housing 61. The motor commutator valve plate 68 is therefore fixed to the motor housing 61 to maintain proper alignment with the separate semi circle kidneys shaped high and low pressure ports.

The transfer of oil between the pump and motor is achieved with the same methods as described with reference to FIGS. 11-14 so as to provide common high and low pressure commutation between the pump and motor semispherical shaped porting on each of the rotating groups.

FIG. 23 illustrates the closed loop circuit (but excludes showing the detail of the motor alternating high and low pressure zones) in schematic form. The hydraulic restraint motor 2 and the variable displacement control pump 3 are connected via a high pressure half of a closed loop circuit 74 and a low pressure half of the circuit. The flow direction and the rotation of the motor piston group 13, the motor wave form cam track 13 and the pump piston group 80 always rotate in the same direction, hence the hydraulic fluid always flows in the same direction in the closed loop circuit 74 and 75, however the displacement volume, speed and pressure varies constantly to meet operational demands and the high and low pressure areas 74 and 75 alternate with changing output loads from a vehicle accelerating or decelerating.

The restraint pump rotating piston group 80 applies the restrained load to the cam track 16 which is fixed to the differential housing via a pivotal point 21 the cam track is restrained from rotating about the pivotal point 21 by a hydraulically assisted servo control 78 being attached to the cam track 16 at a pivotal point 77. The movement of the cam track off centre for variable displacement to meet operational demands is controlled by a microprocessor 79.

Figure 7:
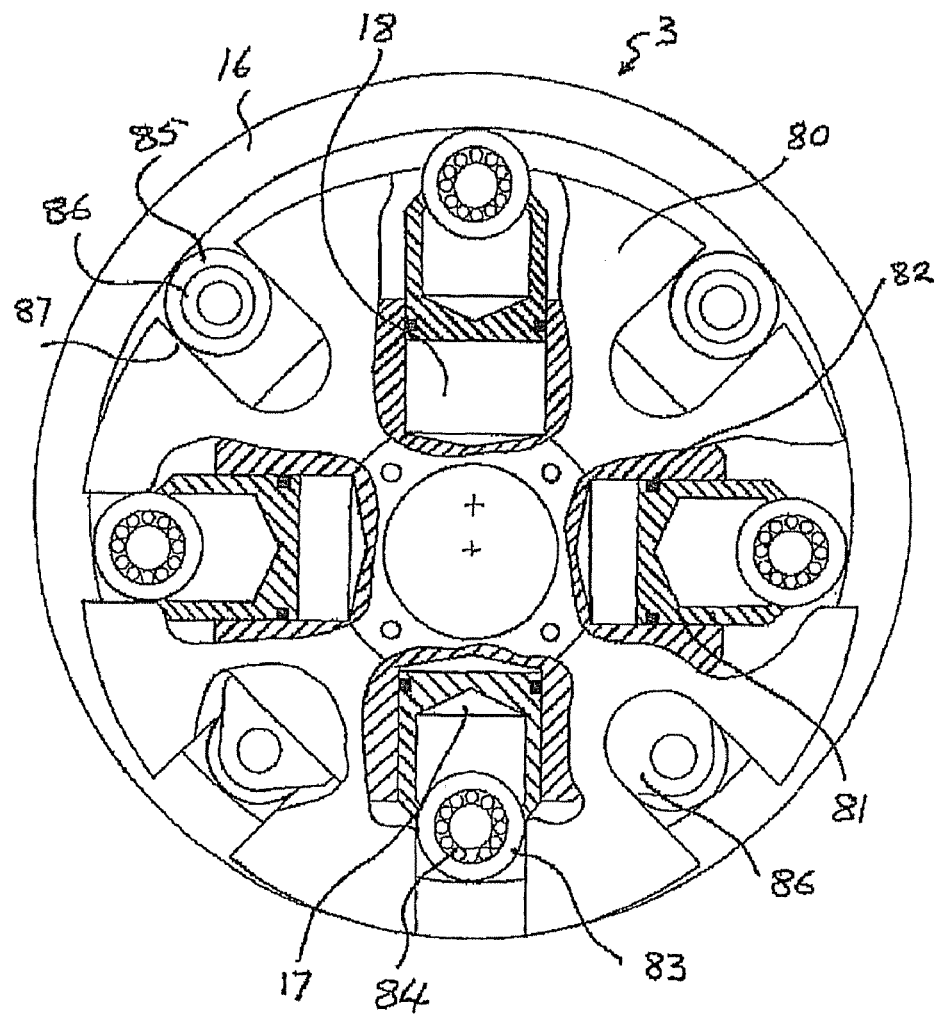
FIGS. 7-10 are schematic representations of a variable displacement radial piston hydraulic pump of the first embodiment.
Figure 8:
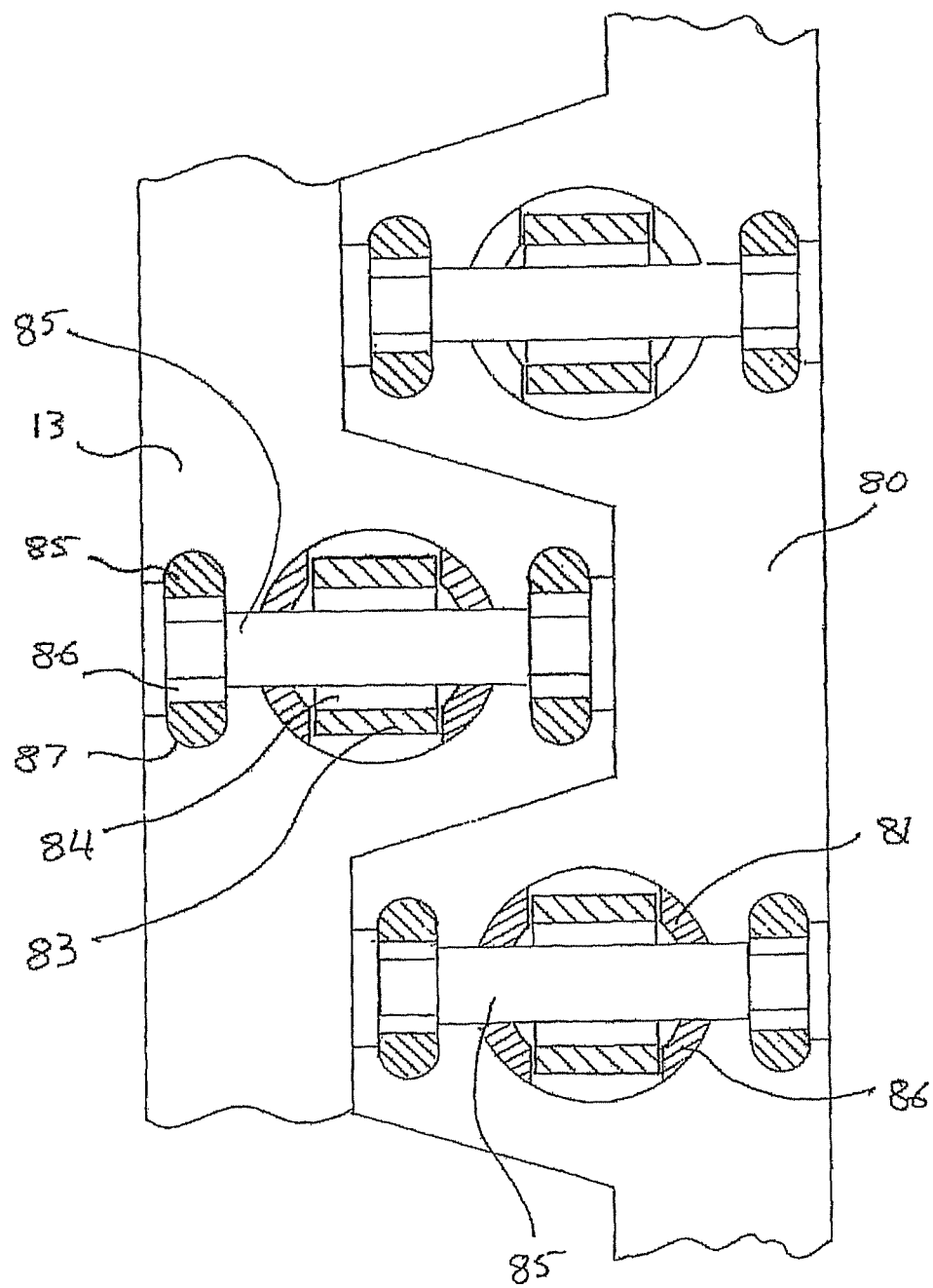
Figure 9:
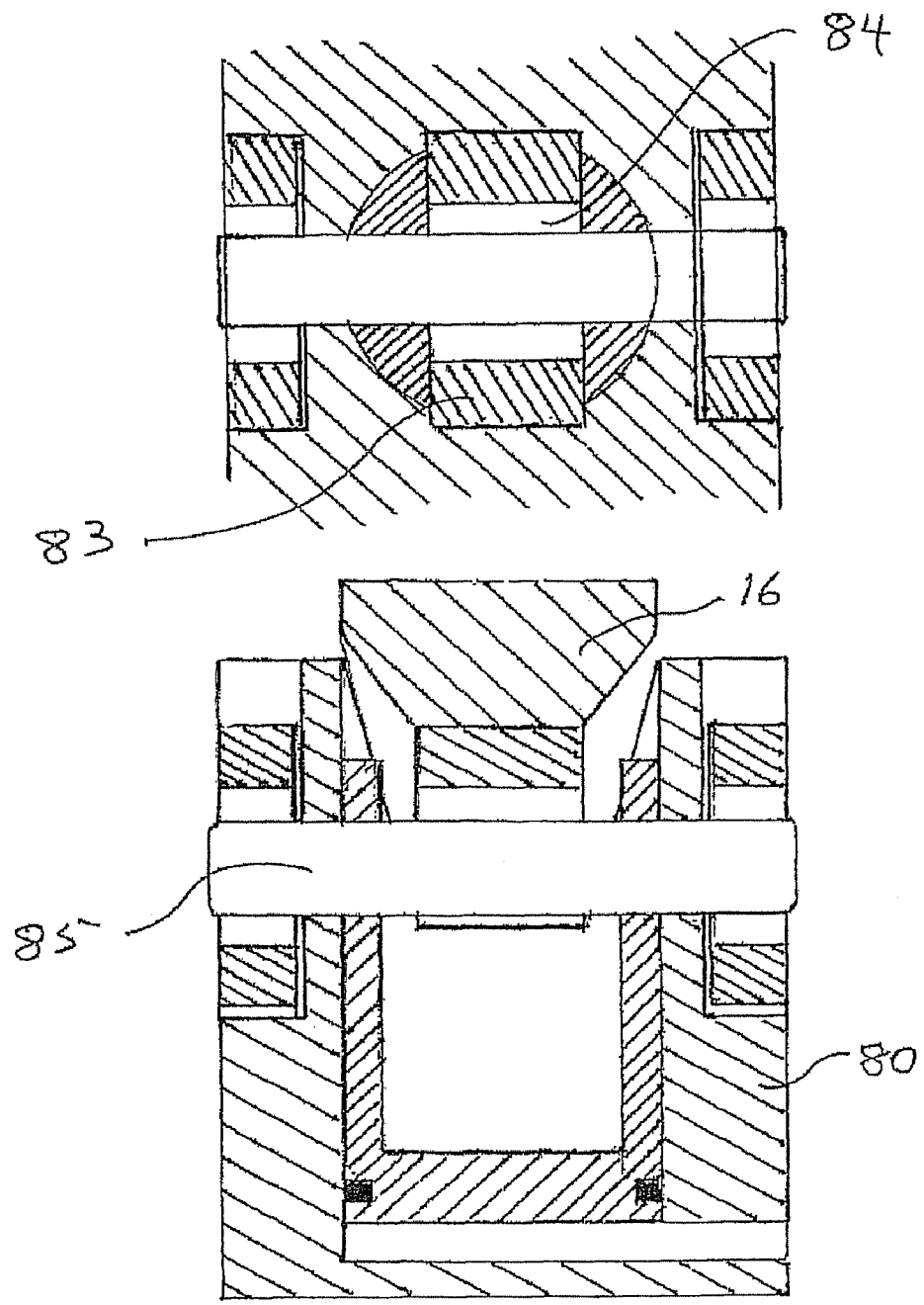
Figure 10:
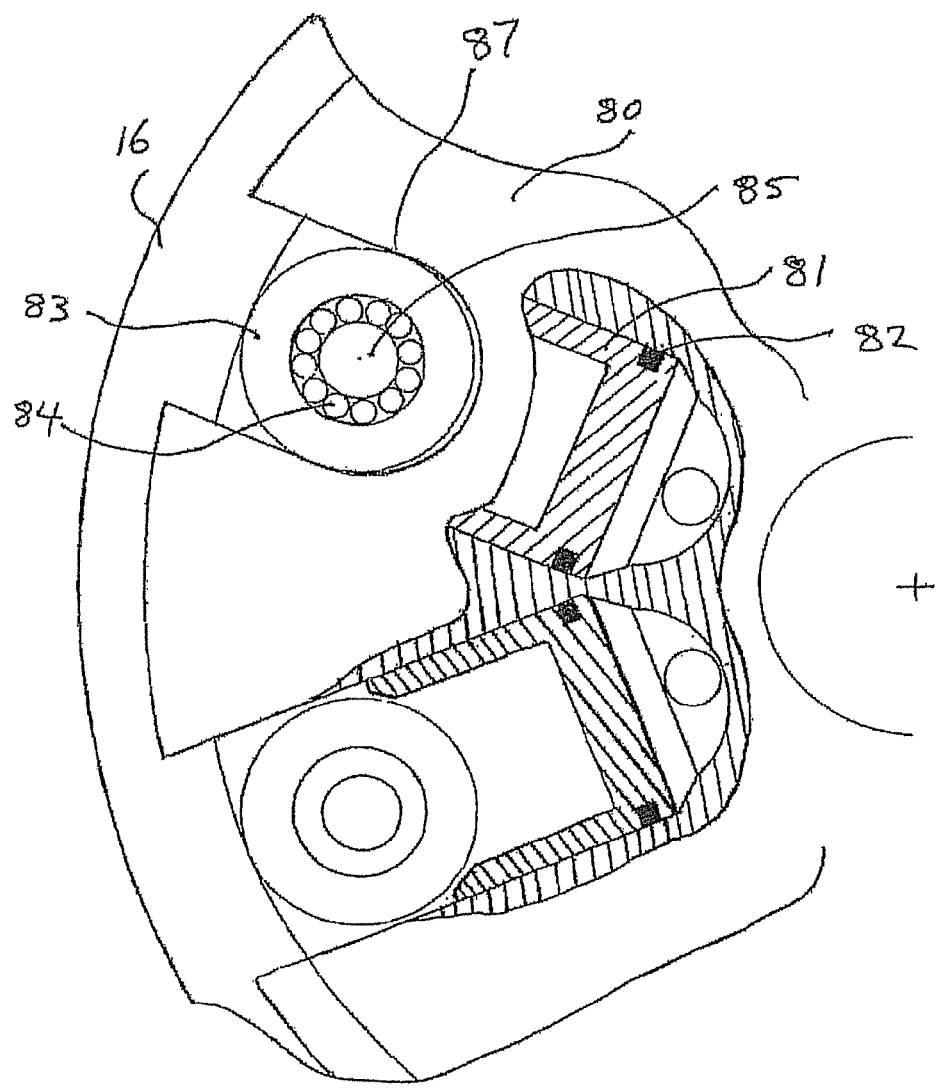
Figure 11:
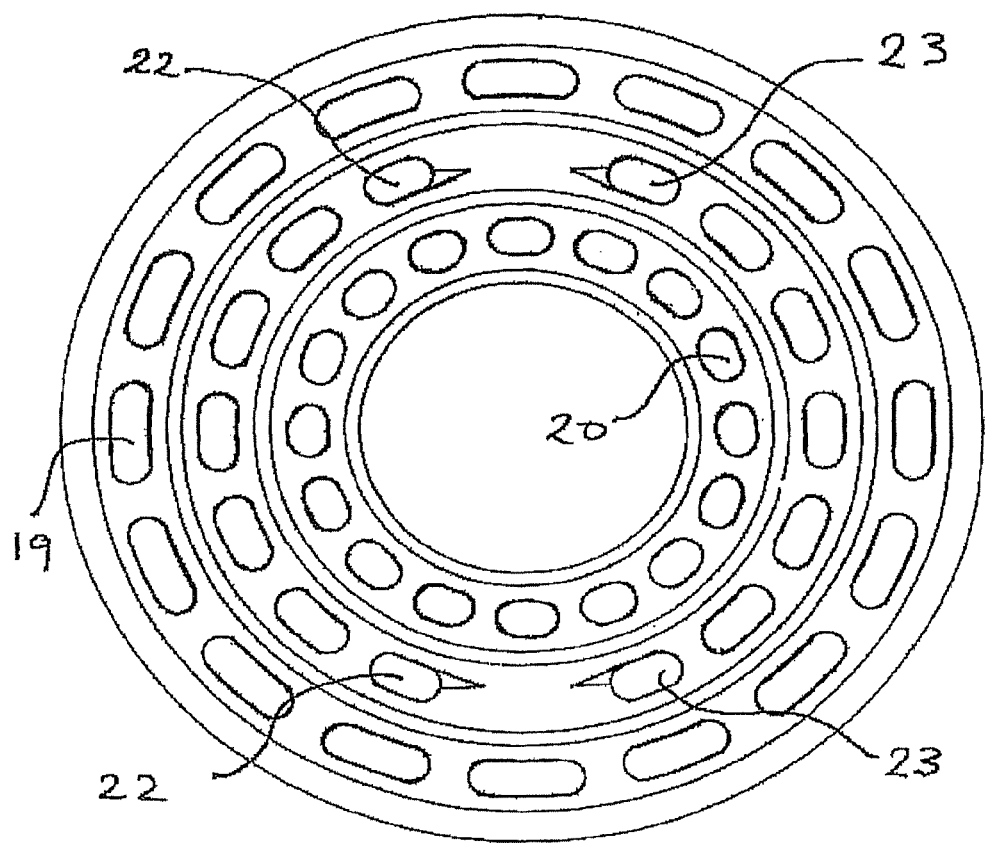
FIGS. 11-16 are schematic representations of a stationary commutator of the first embodiment.
Figure 12:
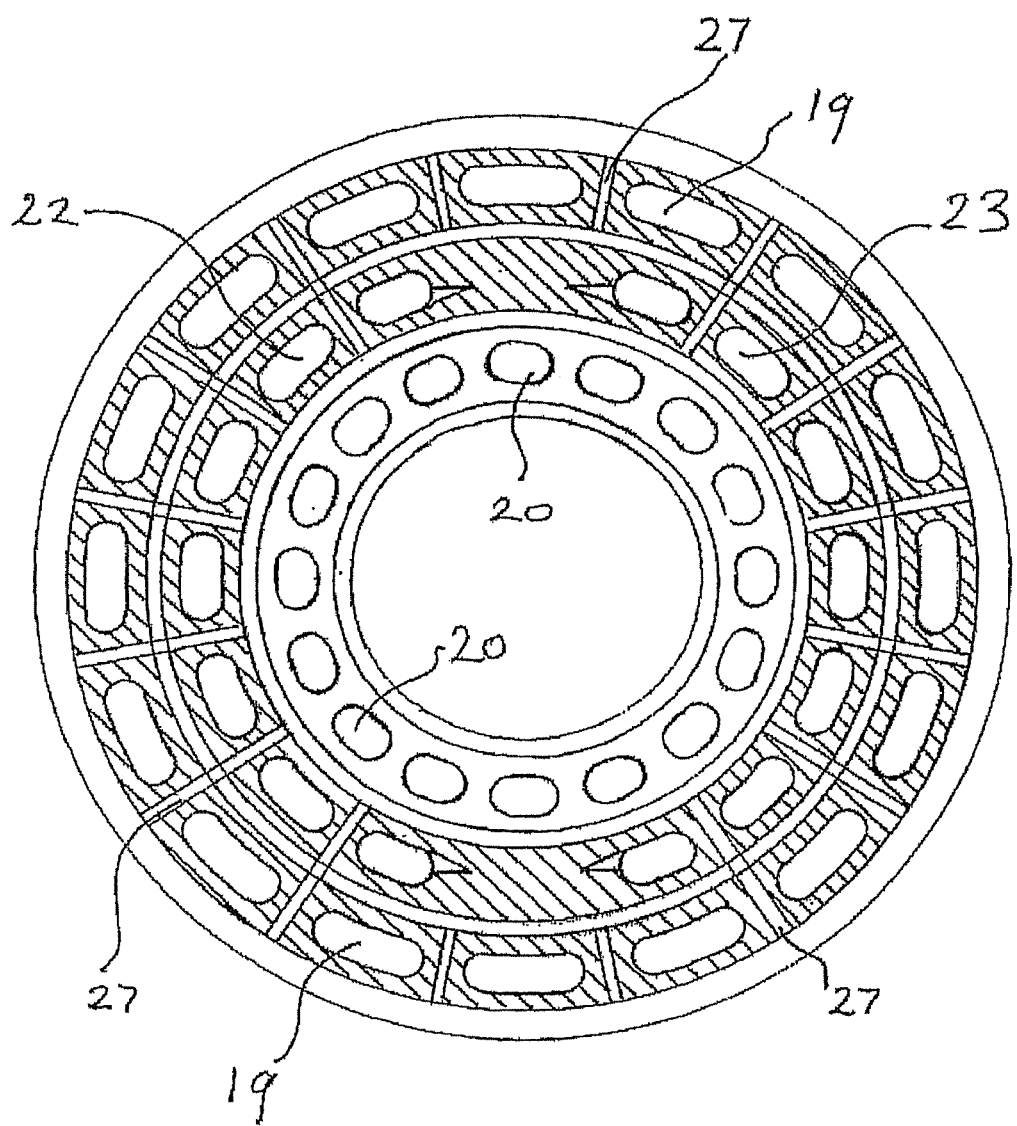

Both the pump and the motor are of the same configuration in the area of rotating piston groups to meet the rigorous torque restraint forces, to have reliability and a long life and to reduce manufacturing costs. FIG. 7 illustrates a partial cutaway of the pump 3 exposing the pistons 81 and piston rings 82—if side load forces are removed from the piston and cylinder entirely then if a ring or rings are used for sealing manufacture tolerances can be reduced for high speed high volume manufacture without a reduction in performance and service life. As illustrated in FIGS. 7-10, the piston 81 and piston ring 82 and cylinder 17, 18 are free from any side load and only subject to direct linear force against the hydraulic fluid. This is achieved by the extended walls of the pistons 81 having piston pins 85 fitted centrally through the piston walls with the cam rollers 83 fitting into the piston on centre line. Thus, any vectored thrust from the action of the roller 83 against the cam track 16 will be imparted precisely on the pin/shaft 85 centre line which is supported via radius rollers 85 that run in machined tracks in the pump body 80. Referring to FIG. 9, as the cam track 16 is flat in the contact area, there is no axial load applied but a radial tangent load is applied due to the offset cam track ring in one embodiment. As illustrated in FIG. 8, the radius rollers 85 running in the machined track 87 takes all the radial loads including side loads imposed on the pin and avoid any of these forces reaching the piston. The pin 85 is stepped so that when the needle roller bearings 84 and the rollers 83 are assembled on the pin and the rollers 87 are lowered into the machined radius slot 87 and the cam track ring 16 is placed around the piston group there is no other assembly necessary in one embodiment. Referring to FIG. 10, in one alternative embodiment for low cost manufacturing, flat faced rollers 83 can run on a flat face 87 with side load being prevented by thrust washers retained by a face plate (not shown).

Embodiments of the present invention provide control and restraint of the free wheeling rotation of the annular pinion carrier without loss of power other than the power required for the normal operation of the charge pump and other hydraulic inefficiencies. Embodiments of the invention also provide a compact rotatable assembly of a variable displacement pump and a fixed displacement motor rotating about the same axis as the transmission differential, with the internal differential and output axles all housed within a differential axle housing. These advantages are provided by hydraulic flow control via multipurpose commutator and valve plates with in one embodiment reversal of flow direction within the pump stationary commutator plate and back through the rotating pump which is controllably varying the flow and volume of the hydraulic fluid being displaced through a commutator which transfers two separate zones of high and low pressure to a 360 degree series of separate ports all at the same diameter to provide discrete areas of high and low pressure to match the rotating motor ports which is achieved by rotating the valve plate in unison with the motor wave form cam track. On the pump oil delivery side, the annular variable off centre cam track is fixed as well as the valve plate so that the semicircular kidney shaped commutator plate orifices stay properly aligned with the pump high and low pressure delivery ports, and then as described above reversed through the commutator and the rotating pump body.

The power unit rpm, torque load and other inputs are input into a microprocessor which provides synergistic analysis instantly and continually making real time outputs to a control device which via hydraulic servo control adjusts the position of the circular cam track off centre to vary the displacement of the pump to thereby act as a variable displacement flow controller. This allows for the power unit to operate at a precise rpm a torque balance for the optimum ratio so that input power matches the output requirements and allows the power source to always operate at the most efficient balance of torque and speed (rpm).

The input power drive is connected to both the first bevel gear and to the rotating piston group. The outer wave form cam track (in the case of the radial piston motor) is connected to the annular pinion carrier. Variation of the pump displacement causes the same displacement of fluid through the radial piston motor this allows the outer cam track to rotate at a different speed relative to the piston group. As the cam track is attached to the annular pinion carrier this causes the corresponding variation of rotational speed between the first bevel gear and the annular pinion carrier and the effect on the out put speed and direction of rotation of the second bevel gear. Displacement of the fluid from the motor is caused by the adjustment of displacement of the pump and therefore must at all times be the same volume of variation. The torque formula for hydraulics is as follows.

$$\frac{Cc/Rev \times \text{Pressure Bar}}{62.857142} = \text{Nm (Newton metres)}$$

Torque forces must always remain balanced between the restraint motor and the flow control pump across the speed and volumetric range of operation and at all times are restrained by a fixed pump cam track or a pump swash plate which is fixed with no possibility of recirculation of torque interfering with the power unit. Because the pump rotating piston group is driven by the rotational speed of the annular pinion carrier which the pump controls, then the rotational speed of the pump will always be the same as the annular pinion carrier.

The very high reactive torque forces restrained by the radial piston motor through the hydraulic circuit reacts directly through the expanding cylinder volume and the movement of the pistons in the pump flow control and is restrained by the cam track which is caused to try to rotate. This rotational force is restrained by the cam track being fixed to the differential housing this then prevents any of the restraint force being applied to the power input source or requiring any power from the power unit to restrain the annular pinion carrier. Thus the power required is directly related to the overall ratio affected between the input and the output.

The power input into the first bevel gear rotates the pinions and the annular pinion carrier in the same direction as the power input. The second bevel gear will remain stationary if subject to load until the pinion carrier is restrained. In preferred embodiment, the pinion carrier is restrained by the waveform cam track acting against the rollers connected to the rotating piston group. The pressure of restraining the pinion carrier is restrained by the pump piston rollers reacting against the variable cam track. For the displacement to be variable at the pump, the pump cylinder/piston chamber must expand in the direction of the pump rotation which is always in the direction of the power input rotation. This means that the torque generated is in the same rotational direction as the power input, and the torque being equal cancel out and remain balanced. The torque restraint at the pump is directly against the variable cam track which is fixed from rotation in one embodiment directly to the differential housing.

The annular pinion carrier restraint forces and the variable volume flow control of the pump are restrained against a variable position cam track which is fixed to prevent rotation and is free from any contact or means of causing the annular pinion carrier restraint forces being transferred to the power input apart from normal charge pump, lubrication and hydraulic efficiency losses. The power input is always only that required to meet the demands of the ratio selected to move the out put load at the second bevel gear. The resultant action of the pinion rotating about the pinion bearing causes the torque load applied to the annular pinion carrier to be always equal to twice the output torque.

When a vehicle is at operating speed the input torque at the first bevel gear and the restraint torque at the annular pinion carrier will be in a ratio of 1:1, and the output torque of the second bevel gear will be also the same with an overall ratio from the power input to output of 1:1. At this point, the cam track on the radial piston pump will be central with zero displacement and zero oil flow, likewise the axial piston pump will be at 90 degrees to the axis of the rotating piston group with the same result as described above. High torque forces are being restrained at this point but with zero pump displacement and with no hydraulic fluid flow there is no work being done and the power source is applying power directly to the out put load. By way of analogy it is like raising a load with a hydraulic jack and leaving the jack support the full heavy load. The high load is continuously present, but no movement, and thus no work, is being done. There is therefore no requirement for power other than conventional power losses.

Figure 24:
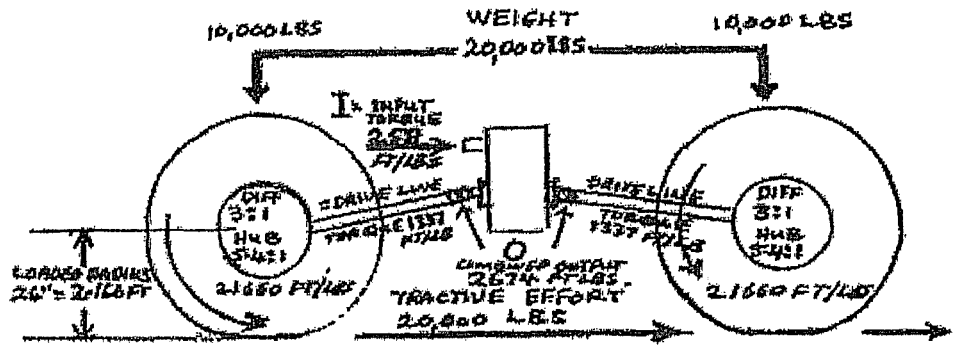
FIG. 24 is a data sheet for calculating input, restraint and output torques for a conventional heavy duty front end four wheel drive loader.

At the other extreme, when the input first bevel gear and the annular pinion carrier is moved slightly off 2:1, it can give an overall input/output ratio between the first bevel gear and the second bevel gear of one million to one, and thus the power source is seeing a torque reduction of one million to one. FIG. 24 is a data sheet of example calculations of torque required for a conventional four wheel drive front end loader to skid the wheels.

FIG. 25 is a data table illustrating that the power input required to skid the loader wheels is only 4.7 kW.

Figure 26:
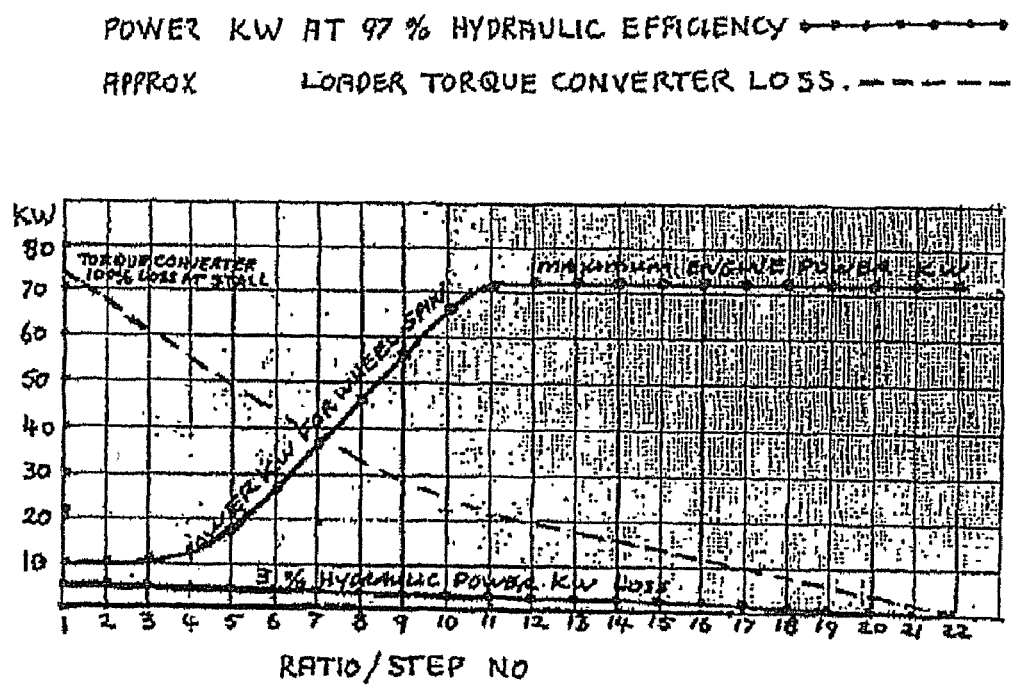
FIG. 26 is a graph comparing the performance of a conventional front end loader respectively fitted with an embodiment of a hydromechanical variable speed transmission of the present invention and a standard torque converter.

FIG. 26 is a graph which illustrates the 100% power loss experienced by conventional front end loaders fitted with torque converters. This occurs particularly at the point of loading the front end loader bucket when the torque converter is on stall. The engine will be running at full peak speed and maximum power for the torque converter to generate torque but the wheels will not be turning or only turning very slowly. This means that on stall the torque converter is turning 100% of the engine horsepower to heat and which requires conventional front end loaders to be fitted with heat exchangers capable of dissipating around 30% of the engine power in heat. This requires further power loss in terms of oil pumps heat exchangers and high capacity fans to cool the torque converter oil. FIG. 26 illustrates that a hydromechanical variable speed transmission of an embodiment of the present invention has the torque restrained by the fixed pump cam track, and that the engine in the front end loader can only see the power required and effected by the very high differential gearing and ratio between the first bevel gear input and the second bevel gear output. As the low torque requirement is input into the microprocessor the output from the microprocessor instantly adjusts the engine speed, and in this case while loading the bucket and just skidding or spinning the wheels while crowding and loading the bucket as illustrated in FIG. 25 this would only require 4.74 kW of power so the output from the microprocessor would balance the engine torque and speed closing the engine throttle to run at a low speed near idle speed.

Illustrative component operating speed calculations are provided for the operational speed of trucks. The calculations use the following data.

Loaded radius of 10.00–20 truck tyre=20.25 inches (514.35 mm)×2=1028.7 mm diameter× 3.1428571=3.233 metre circumference 100 Kilometres per hour=1666 metres/minute 1666 divided×3.233 meters=515.5 rpm At a cruise speed of 100 kilometres per hour the truck axle and differential are rotating at 515.5 rpm.

The outer differential transmission input ratios of the first bevel gear and the annular pinion carrier will be 1:1 and there will be zero hydraulic oil flow or hydraulic pump/motor rotation relative to each other but they will be rotating in unison at 515.5 rpm.

With the vehicle stationary at dynamic neutral lock regardless of power input rpm at dynamic neutral lock the differential hydraulic speed variation between the first bevel gear and the annular pinion carrier will be 2:1 requiring the hydraulic speed variation to be 515.5 divided×2=257.75 rpm. This makes the choice of radial piston pumps and motor very suitable for the high torque loads and relatively low rpm speed requirement.

| | |
|---|---|
| If 0 to 100 km/hr requires an rpm variation of the pinion carrier of: | 257.5 rpm |
| Then for 10 km/hr reverse will require a further reduction of: | 23.03 rpm |
| It can be seen the total hydraulic speed variation will be: 515.5 rpm/232.03 rpm = required ratio of 2.22:1. | 232.03 rpm |

An illustrative embodiment of the present invention using a fixed displacement multilobed wave form cam track radial piston motor provides a motor that is compact with high displacement per RPM for high torque load restraint. Illustrative performance data for this embodiment are as follows.

8 pistons×6 lobes==48 strokes/rev say 12 mm stroke=576 mm piston travel per rev=57.6 cm If the piston diameter was 30 mm diameter=3 cm Area=1.5×1.5 cm×3.1428571=7.071 square cm 7.071 square cm×57.6 cm piston travel/revolution=407 cc/revolution The total variation of the input rpm to the annular pinion carrier of 232.03 rpm to give 10 km/hr reverse will be 515.5 rpm minus 232.03 rpm=283.47 rpm 283.47 rpm at 407 cc/revolution divided by 1000=115.37 litres/min As the annular pinion carrier is directly rotating the pump piston group at 232.03 rpm 115.37 litres divided× 232.03=0.49722 litres per rev or 497 cc/revolution Using a cam ring pump that can be offset of centre for displacement variation allows the entire control in this one simple function.

An adjustable off centre cam ring provides one piston stroke per rotation, using 8 pistons in the rotating group 497 cc/revolution divided×8=62 cc capacity per piston stroke per rev at full cam track at full offset full piston travel for reverse.

Using a 5 cm piston diameter 2.5 cm×2.5 cm×3.1428571=19.6428 square cc 62 cc divided×19.6428=3.156 cm piston/cylinder stroke length required for maximum displacement in reverse It will be understood that the above performance data are example calculations only, and that actual performance data for embodiments of the invention may be relatively more advantageous.

Embodiments of the present invention provide a hydromechanical mechanical vehicle transaxle or powertrain in which an oil flow control device, for example an hydraulic pump and/or a hydraulic motor, is driven by a rotating annular pinion carrier which the pump restrains and controls the volumetric displacement and hydraulic fluid flow, which in turn controls the speed of rotation of the rotating pinion carrier and pinions, including the speed at which the pump rotates. The restraint forces being retained by the pump variable cam track being fixed to the differential housing in the case of the radial piston pump embodiment. The restraint forces are retained by the pump swash plate, which is fixed and not free to rotate in the case of the axial piston pump embodiment. In both embodiments, the power source is isolated and free from torque from the differential, the annular pinion carrier and pinions and can not be transferred back to the input power source. The piston groups and the cam track of the radial piston motor embodiment (or the fixed displacement swash plate of axial piston motor embodiment) rotate as well as rotating at a variable speed to each other subject to the pump displacement. In both embodiments, the means of varying the pump displacement is fixed and not free to rotate with the pump with stationary semicircular commutator valve port plates which convert the high pressure and low pressure semispherical sides of high and low pressure to two 360 degree separate high and low pressure areas which can communicate with valve commutator port plates that rotate in a fixed position relative to the cam track lobes and the fixed displacement swash plate of the respective hydraulic motors to allow proper communication of hydraulic fluid at the correct position to allow the filling and discharge of the cylinders regardless of the rotation of the rotating piston groups and cam tracks and plates.

Embodiments of the present invention provide the following advantages.

A compact hydromechanical mechanism that will fit within a differential or transaxle housing for all components to rotate about a common axis.

Control reactive and recirculation torque to react directly between a fixed mounting and the rotating differential pinions, free from direct connection to the power source.

A combination of fluid displacement control with interconnected components rotating about the axle axis of the differential.

A means of fluid flow commutation and valve control between the rotating components by using the pump commutator valve plates to convert flow and high pressure semispherical sides of the pump to a high and low pressure full circle separate high and low pressure areas and to reverse flow direction from the pump back to and through the pump to connect to the motor which rotates about the same axis. The motor commutator valve plates to convert flow and high pressure from two separate spherical areas of high and low pressure to one radial location but in intermittent high and low pressure areas to match the multi lobed radial piston motor cam track.

Use pump and motor common valves and commutator plates and piston groups as a high pressure high volume rotary hydraulic fluid connector.

The elimination of hosing, and high speed and high volume rotating connectors external to pump and motor commutator valve plates by means of direct interfacing rotatable components.

Mechanical control of divergent thrust on hydraulic components thereby enabling simpler lower cost manufacture of hydraulic components and to eliminate side thrust.

The elimination of complicated costly relief valves by using real time instantaneous transmission speed and torque inputs to and outputs from a microprocessor to stay within pre-programmed pressure limits.

Multistack overlapping pancakes of axial piston cylinder assemblies for ease of selection and provision of torque control requirements.

The elimination of oil bath splash lubrication in the differential and by so doing eliminate hydrodynamic drag and resultant power loss.

Allow filtration of common hydraulic and differential lubricating oil.

The provision of spray jet lubrication delivered precisely to the high load areas.

Provision of oil cooling of oil for the hydraulic and differential mechanical components.

The present invention is not limited to the embodiments that have been described and depicted, but variations and modifications may be made without departing from the scope of the present invention. For example, the invention is not limited to radial or axial piston hydraulic pumps but may also be implemented using other conventional variable displacement hydraulic pumps, for example a bent axis variable speed hydraulic pump.

The invention claimed is:

1. A hydromechanical variable speed transmission including outer and inner differential gear trains each having planet pinions meshing with two coaxial side gears, the side gears of the outer differential gear train being ring gears one of which is an input ring gear and the other of which rotatably drives the inner differential gear train, the side gears of the inner differential gear train respectively rotatably driving two coaxial output shafts which extend axially outwards through the ring gears of the outer differential gear train, the outer differential gear train rotatably driving a hydraulic motor which is fluidly coupled by a hydraulic circuit to rotatably drive a hydraulic pump having a pump control for changing the displacement of the hydraulic pump in response to rotation thereof, wherein the hydraulic motor, the hydraulic circuit and the hydraulic pump are coaxially mounted on a hollow input shaft between the input ring gear and a driving ring gear and the pump control is fixed from rotation to thereby isolate the input ring gear from torque recirculation.

2. A hydromechanical variable speed transmission according to claim 1, wherein the input ring gear is rotatably driven by the hollow input shaft which coaxially surrounds one of the output shafts and is rotatably driven by the driving ring gear meshing with a driving pinion of a drive shaft.

3. A hydromechanical variable speed transmission according to claim 1, further including a transmission housing which integrally houses the outer and inner differential gear trains, the hydraulic motor, the hydraulic circuit and the hydraulic pump.

4. A hydromechanical variable speed transmission according to claim 3, wherein the hydraulic pump includes radial pistons and the pump control includes a cam ring which is rotationally fixed to the transmission housing but is radially movable to change the displacement of the radial pistons.

5. A hydromechanical variable speed transmission according to claim 1, wherein the hydraulic pump includes a stationary pump housing with axial pistons and the pump control includes an inclined swash plate which is rotationally fixed to the pump housing but is inclinably moveable to change the displacement of the axial pistons.

* * * * *